June 27, 1944.  E. P. BULLARD, 3D., ET AL  2,352,185
MACHINE TOOL
Filed Sept. 26, 1941  15 Sheets-Sheet 1

INVENTORS
EDWARD P. BULLARD, III
LEROY E. ALVEY
BY FRANK H. MUSSLER
ATTORNEY

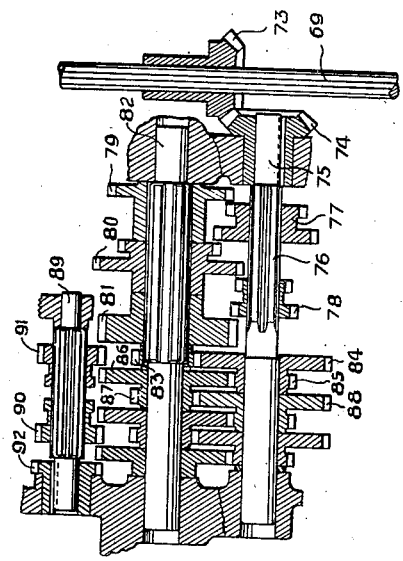
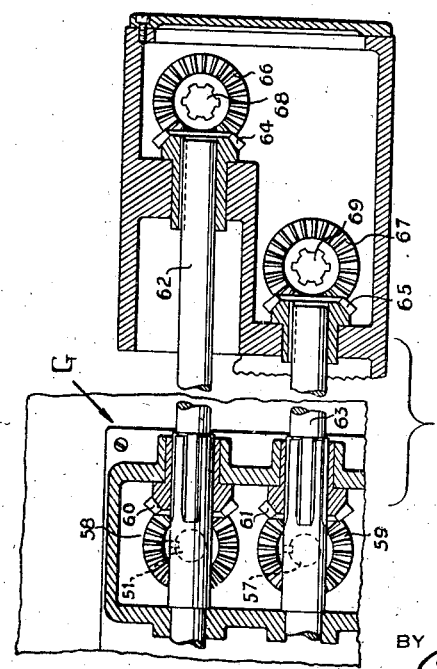
Fig. 3
Fig. 4

June 27, 1944.  E. P. BULLARD, 3D., ET AL  2,352,185
MACHINE TOOL
Filed Sept. 26, 1941  15 Sheets-Sheet 4

INVENTORS
*Edward P. Bullard, III*
*Leroy E. Alvey*
*Frank H. Mussler*
BY
*Paul M. Gist*
ATTORNEY June 27, 1944. E. P. BULLARD, 3D., ET AL 2,352,185
MACHINE TOOL
Filed Sept. 26, 1941 15 Sheets-Sheet 8

INVENTORS
Edward P. Bullard III
LeRoy E. Alvey
Frank H. Mussler
BY
Paul M. Gest
ATTORNEY

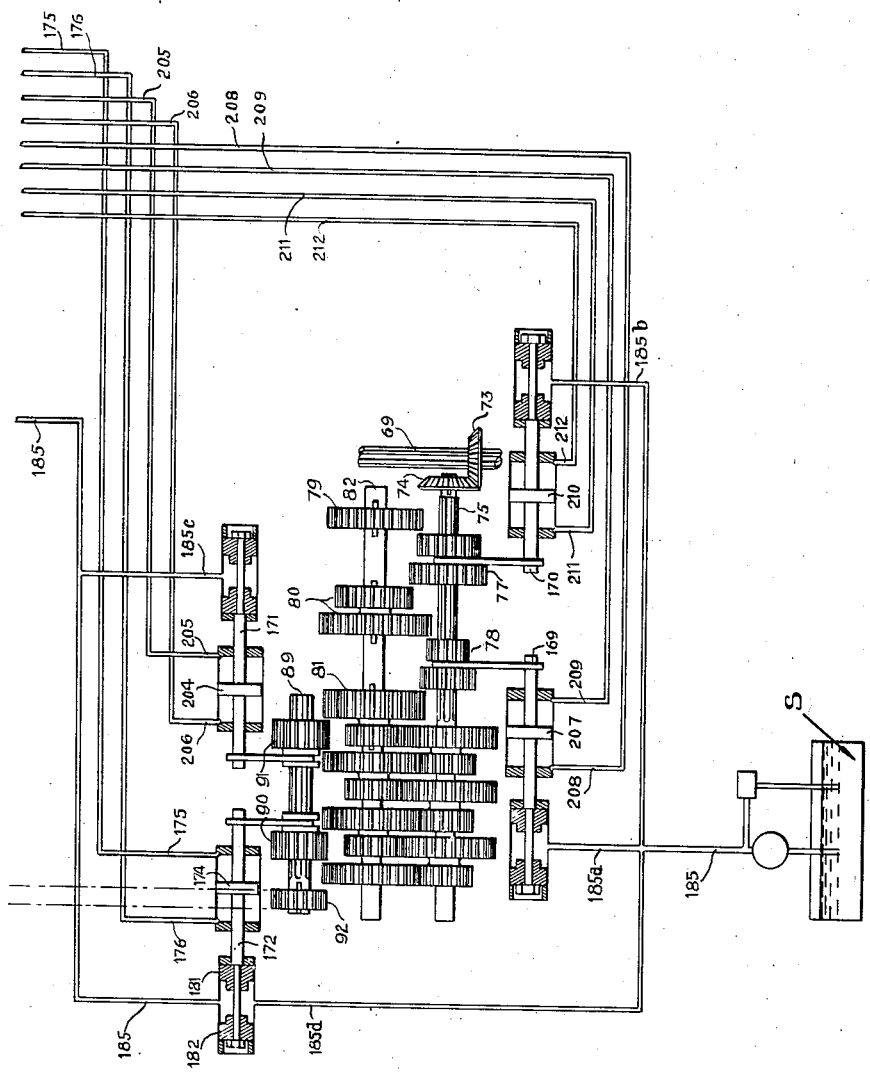

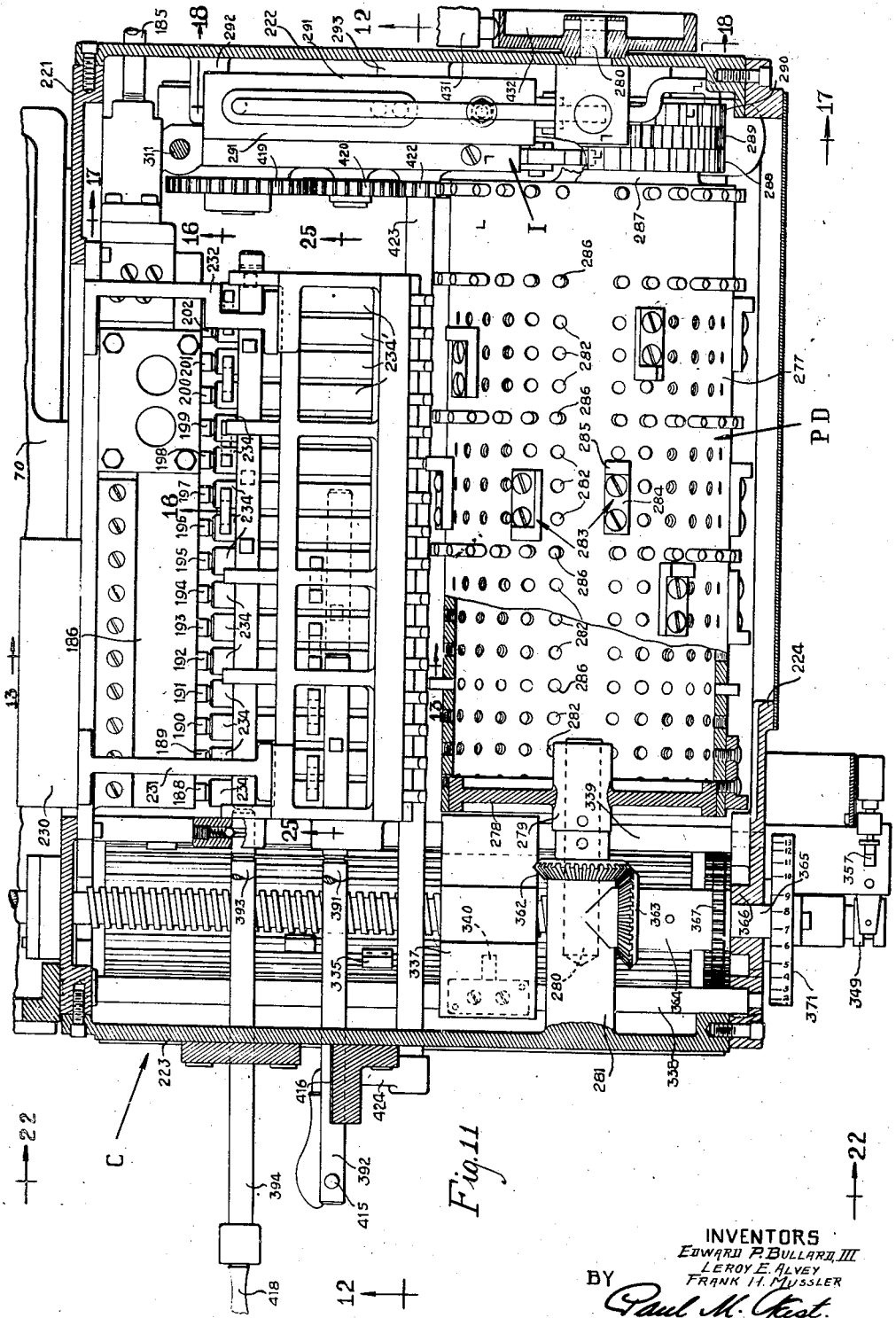

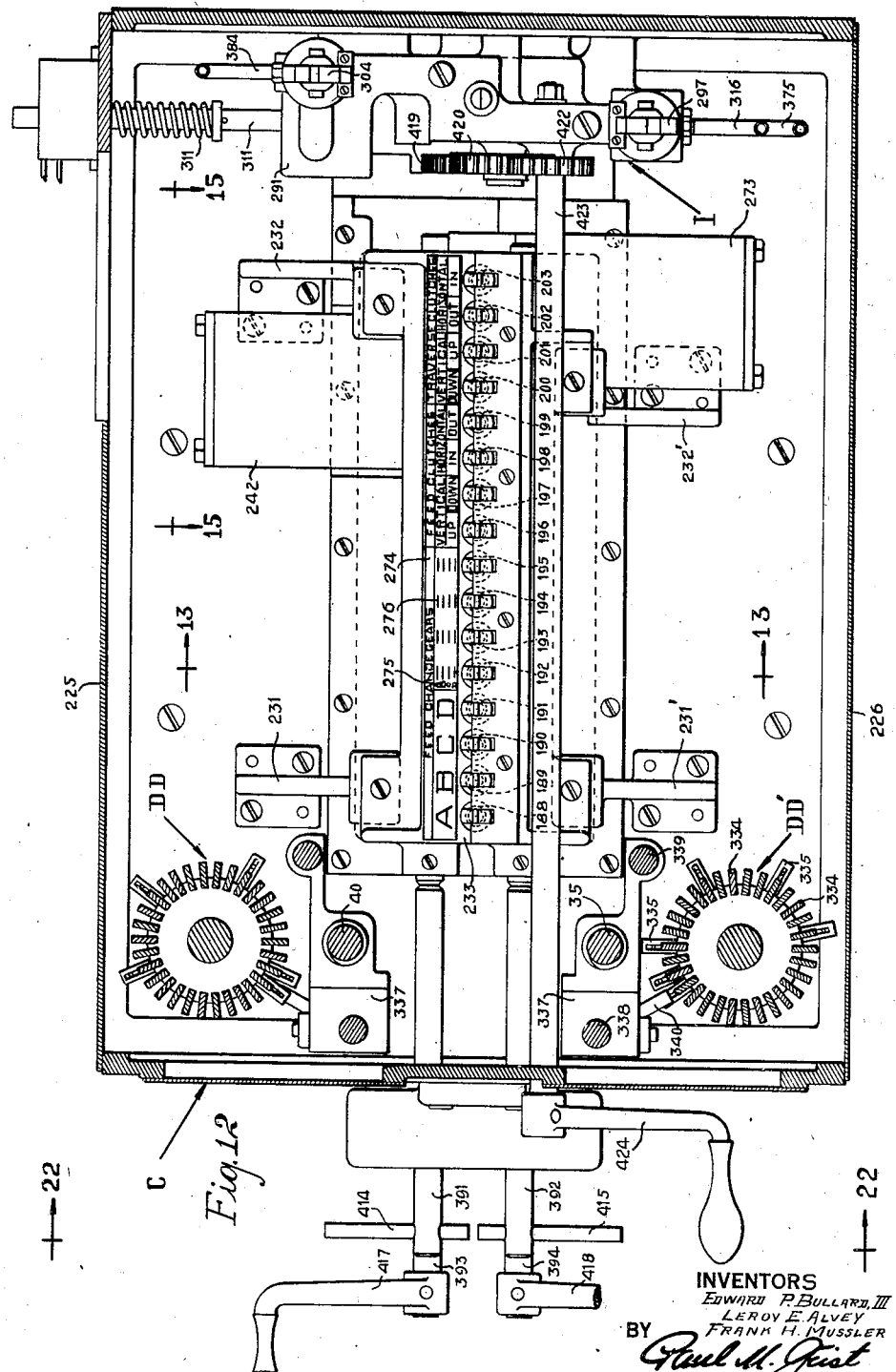

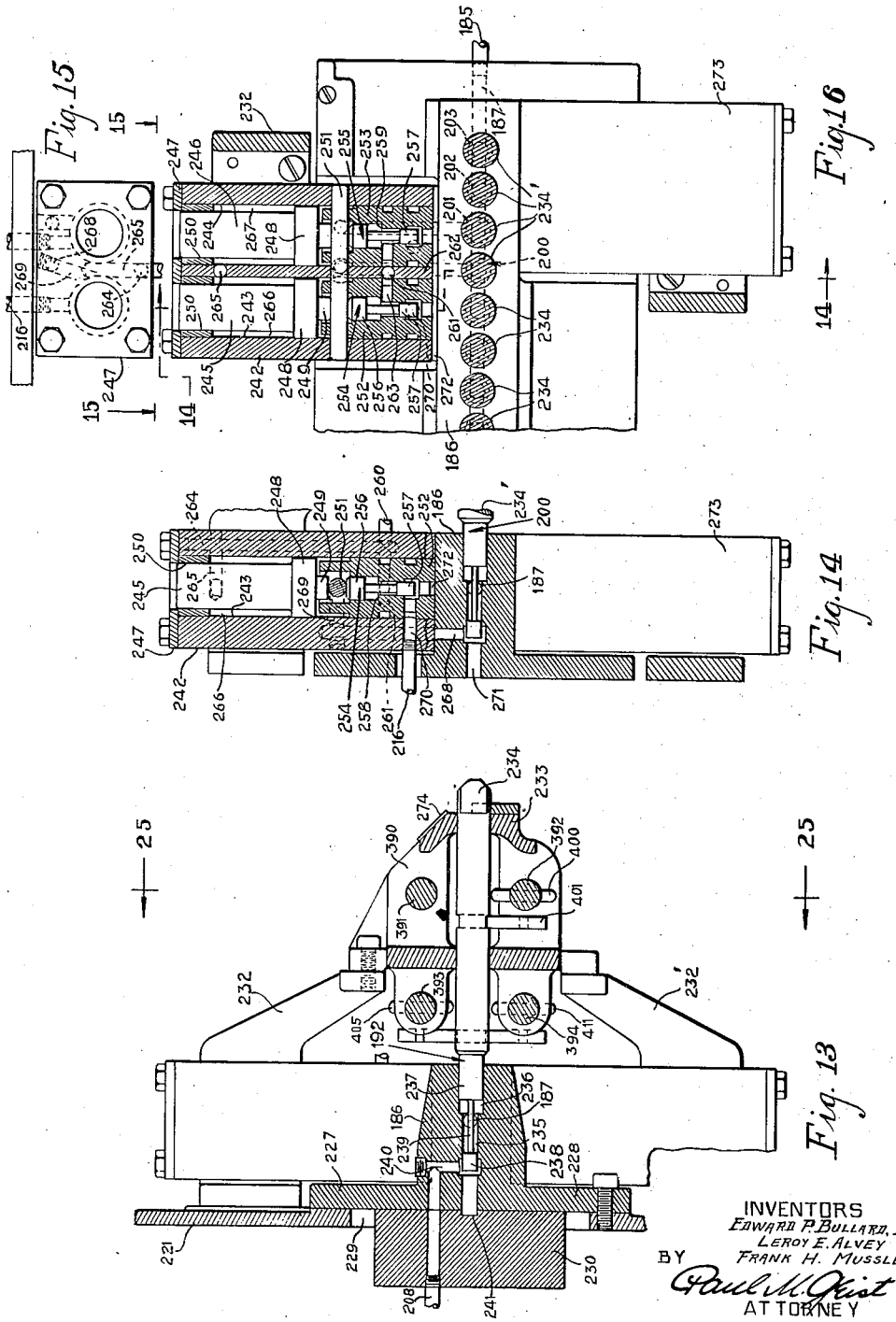

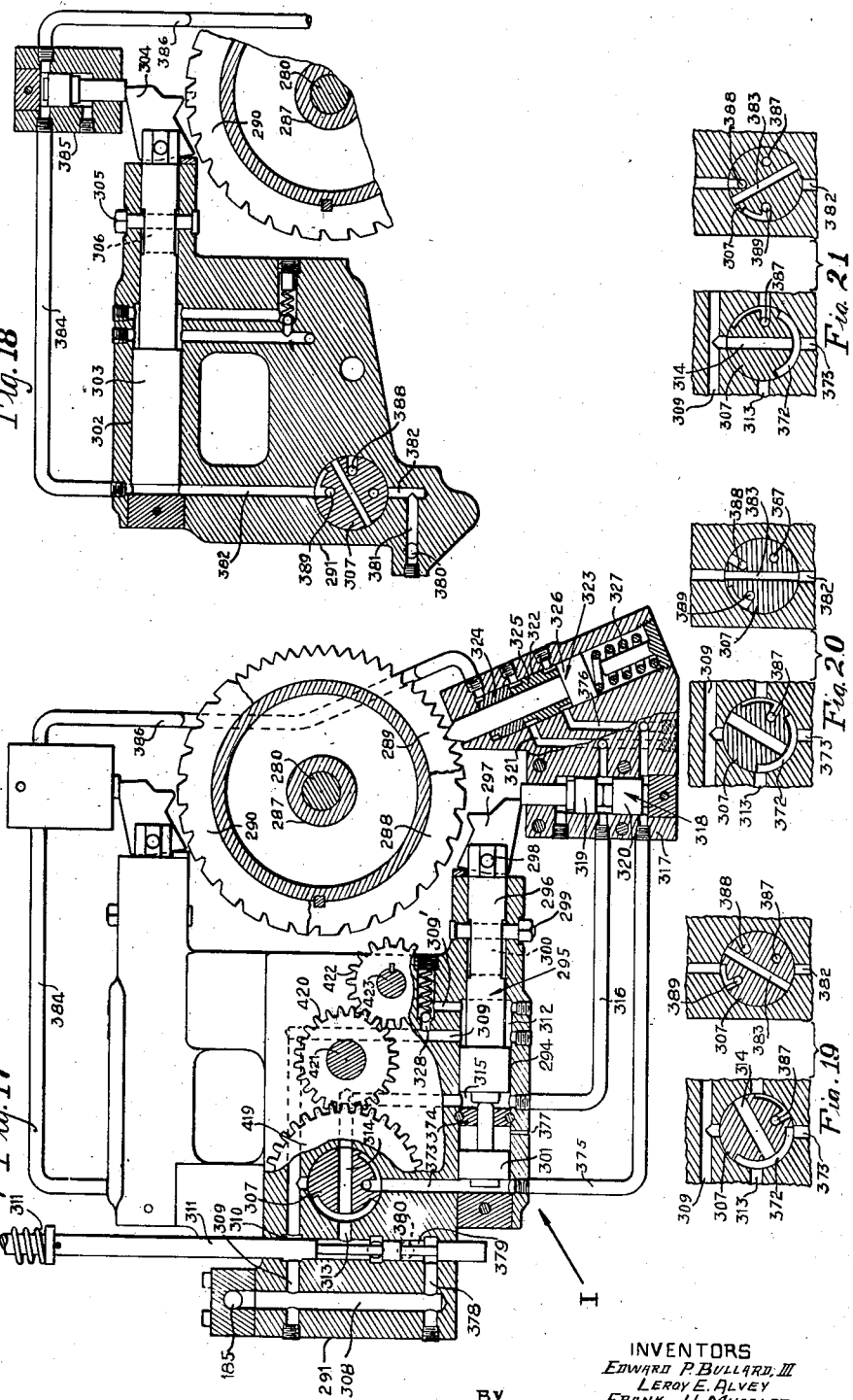

June 27, 1944.  E. P. BULLARD, 3D., ET AL  2,352,185
MACHINE TOOL
Filed Sept. 26, 1941  15 Sheets-Sheet 14
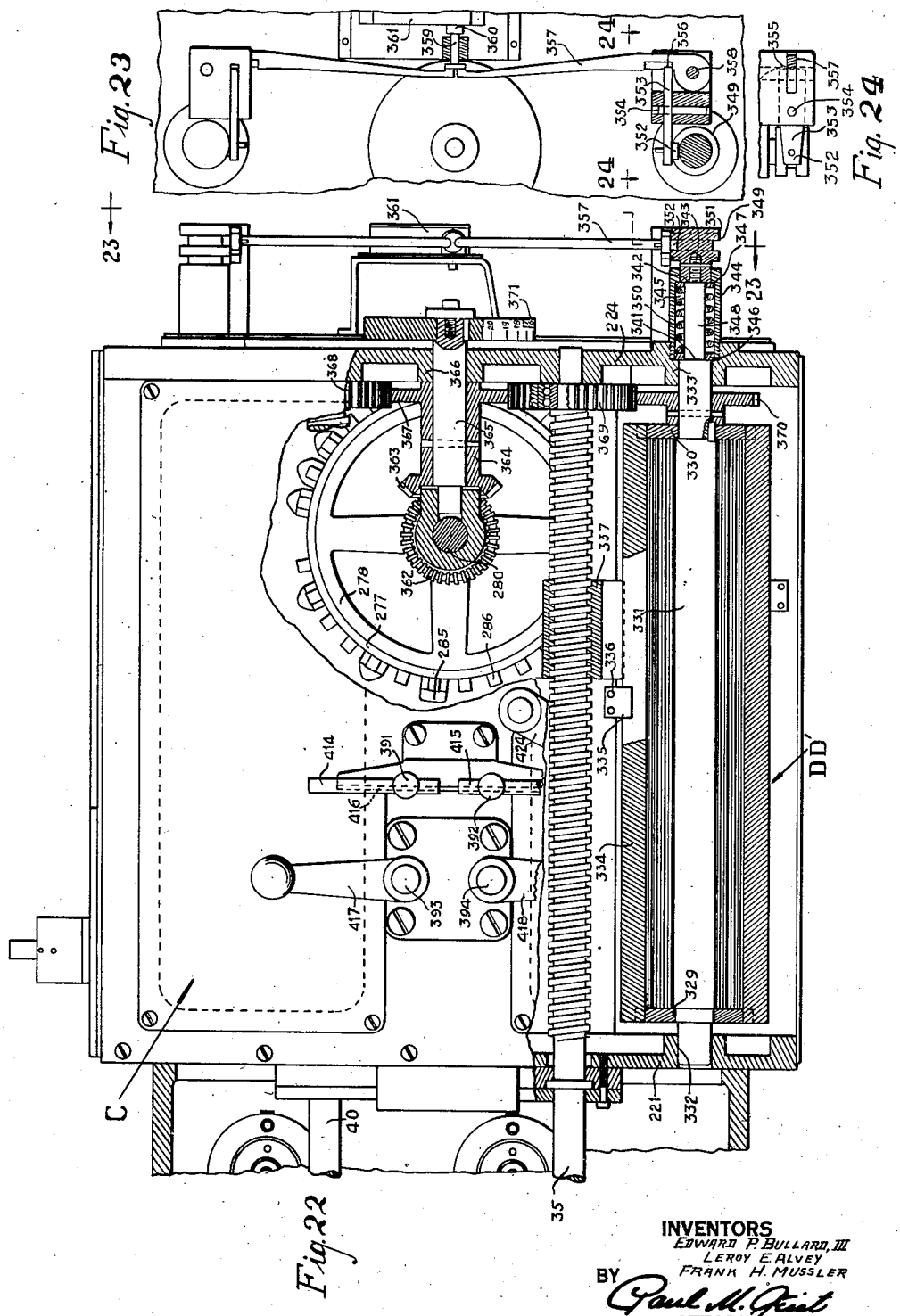

June 27, 1944.　　E. P. BULLARD, 3D., ET AL　　2,352,185
MACHINE TOOL
Filed Sept. 26, 1941　　15 Sheets-Sheet 15
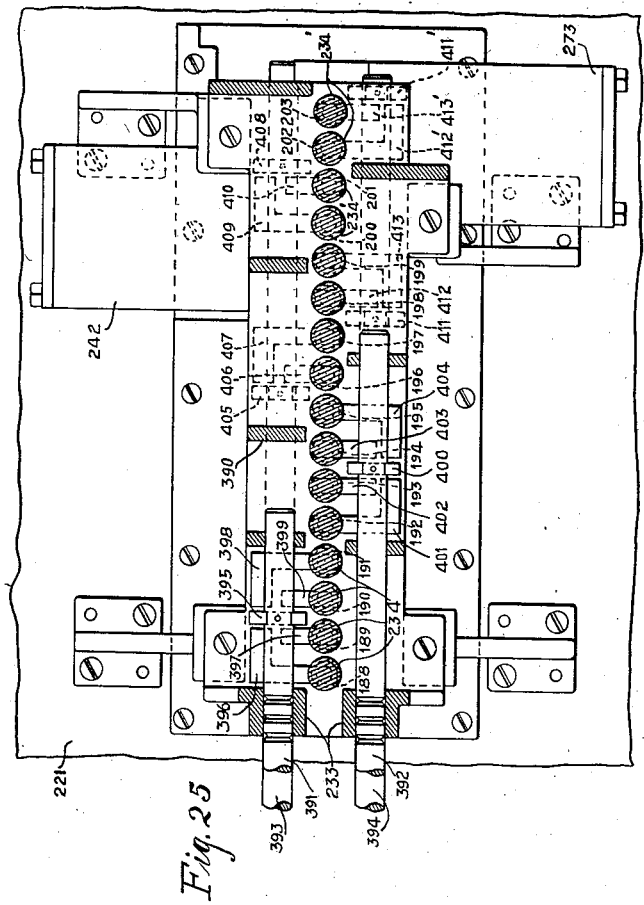
INVENTORS
EDWARD P. BULLARD, III
LEROY E. ALVEY
BY FRANK H. MUSSLER
Paul M. Geist
ATTORNEY Patented June 27, 1944

2,352,185

UNITED STATES PATENT OFFICE 2,352,185

MACHINE TOOL

Edward P. Bullard, III, Fairfield, Le Roy E. Alvey, Bridgeport, and Frank H. Mussler, Stratford, Conn., assignors to The Bullard Company, a corporation of Connecticut Application September 26, 1941, Serial No. 412,490

46 Claims. (Cl. 29—29)

This invention relates to machine tools of the type including a transmission for moving a member along one or more paths at a plurality of speeds, and particularly to a combined fully automatic and manual control for the transmission.

The principal object of the invention is to provide a fully automatic control for the feedworks transmission of a machine tool, adapted to operate the transmission throughout any cycle including any combination of operations of which the machine tool is capable, and one that is adapted to permit manual control of the machine tool without affecting the automatic setting of said control.

Other objects include, the provision of a control for a machine tool including fluid-actuated means for rendering effective the feedworks transmission thereof that is adapted to be automatically operated in accordance with a predetermined setting and manually operated without affecting said predetermined setting; the provision of such a control in which the means that is adapted manually to operate the fluid-actuated means cooperates with means common to the automatic operating means; the provision of a control for a machine tool including a pattern drum and fluid-operated mechanism for indexing the drum varying amounts and in opposite directions for performing different functions; the provision of a combined fully automatic and manual control for the feedworks transmission of a machine tool that can be manually set for automatically directing the operation of the transmission to produce a sequence of functions in a predetermined order, to effect stopping of the transmission upon completion of the function being performed at any time, to effect a repetition of the function being performed or just completed, and to effect instant stopping of the transmission at any time; the provision of a transmission control for a machine tool, the operation of which is initiated by a force separate from that developed by the movement of the member driven by the feedworks and which operation is effective instantly upon said member arriving at predetermined points along its paths of travel; the provision of a machine tool in which a plurality of relative movements are adapted to be provided between a tool support and a work support along one or more paths, and a fully automatic control therefor, the activity of which is initiated by a source of power separate from that incident to, but which source is rendered effective by the relative motion between the work and tool supports; and the provision of a machine tool comprising a tool and work support between which relative motion is adapted to be applied including a plurality of slow feeding speeds and a fast traverse speed, and an automatic control for said machine tool that is capable of selecting the path, speed and direction of said relative movement between said supports for producing a plurality of functions, and in which a time-delay is rendered effective each time the fast traverse relative movement is provided between said supports.

The above, other objects and novel features of the invention will become apparent from the following specification and accompanying drawings, in which:

Figure 3 is a sectional plan view taken substantially along the line 3—3 of Figure 2;

Figure 4 is a sectional stretch-out view taken substantially along the line 4—4 of Figure 6;

Figures 9 and 10 are schematic diagrams of the fluid system of the apparatus;

Figure 11 is a sectional plan view of the control mechanism with certain parts broken away to show others, and taken substantially along line 11—11 of Figure 2;

Figure 12 is a sectional elevational view taken substantially along line 12—12 of Figure 11;

Figure 13 is a sectional elevational view taken substantially along line 13—13 of Figures 11 and 12;

Figure 14 is a sectional elevational view taken substantially along line 14—14 of Figure 16;

Figure 15 is a top plan view taken substantially along line 15—15 of Figures 12 and 16;

Figure 16 is an elevational view, partly in section, and taken substantially along line 16—16 of Figure 11;

Figure 17 is a sectional view taken substantially along line 17—17 of Figure 11;

Figure 18 is a sectional elevational view taken substantially along line 18—18 of Figure 11;

Figures 19, 20 and 21 are details concerning Figures 17 and 18;

Figure 22 is a front elevational view with parts broken away to show others and taken substantially along line 22—22 of Figures 11 and 12;

Figure 23 is a side elevational view of part of the apparatus shown in Figure 22 and taken substantially along the line 23—23 thereof;

Figure 24 is a plan view taken substantially along line 24—24 of Figure 23;

Figure 25 is a sectional elevational view taken substantially along line 25—25 of Figures 11 and 13; and Figures 26 and 27 are views of a detail of the invention.

Although the principles of the invention have been shown and will be described as applied to a vertical turret lathe, they may be applied with equal facility to any type of machine, irrespective of whether it is used to machine metal, wood, et cetera, which machine includes one or more tool-supporting members adapted to be moved along one or more paths.

This application contains subject matter similar to that of application Serial Number 345,772, filed July 16, 1940, by E. P. Bullard III et al.

Figure 1:
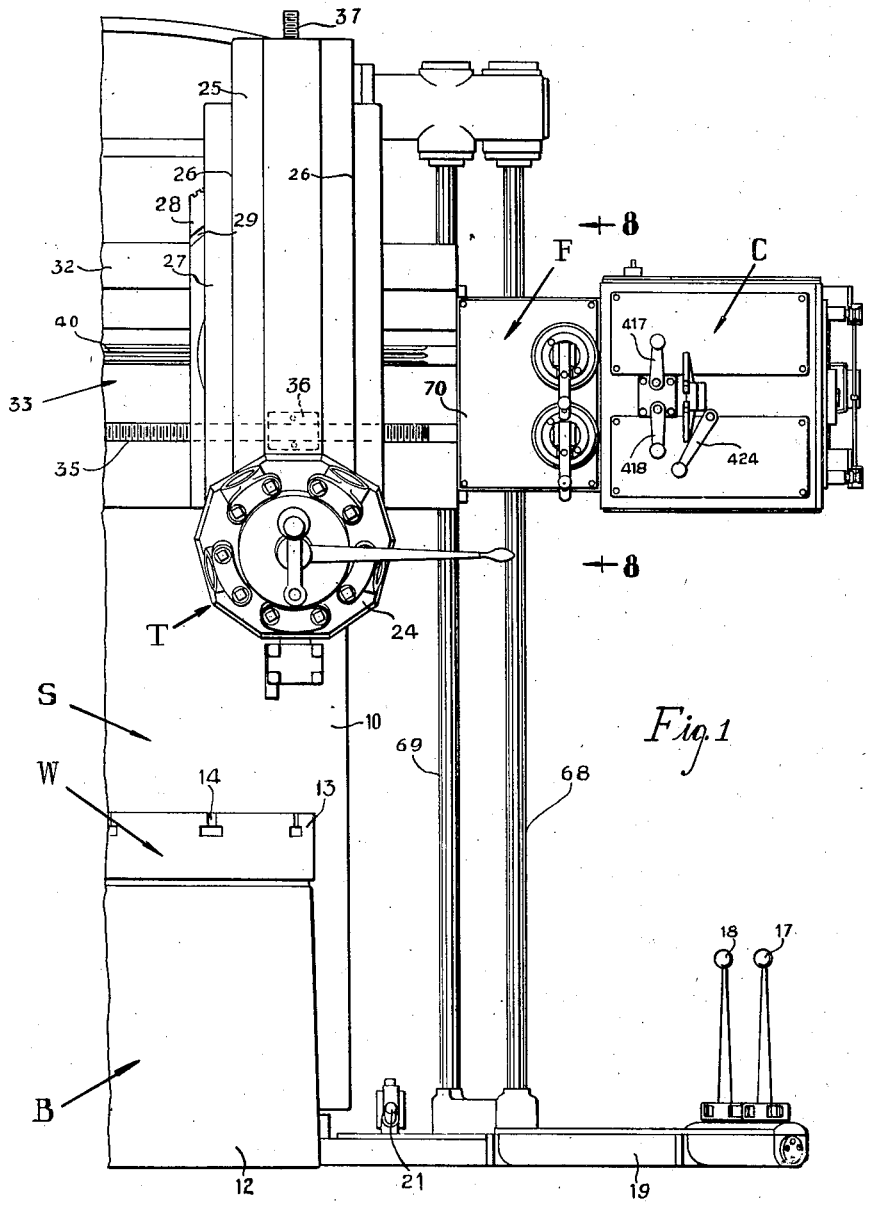
Figure 1 is a front elevational view of part of a machine tool to which the principles of this invention have been applied.
Figure 2:
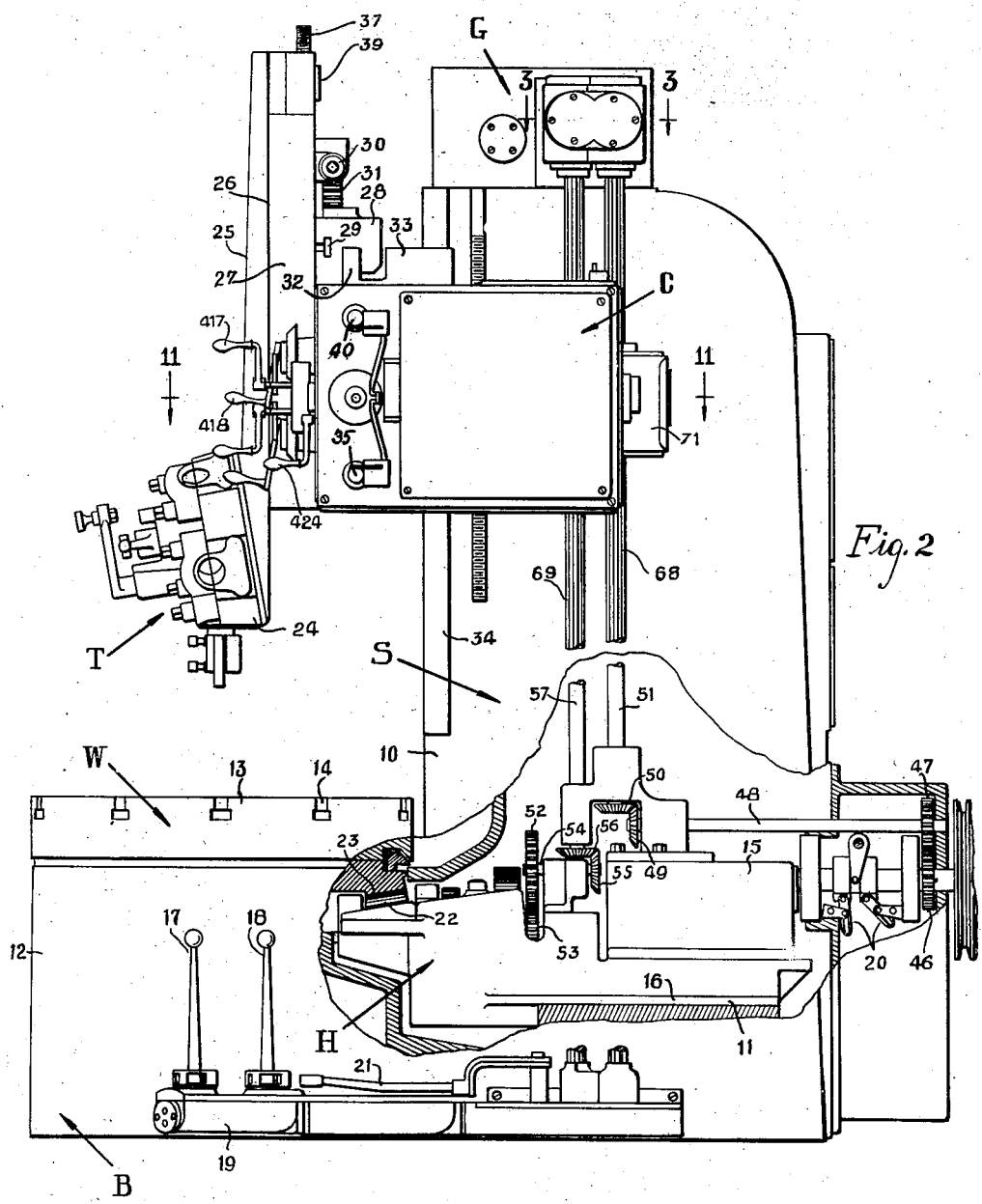
Figure 2 is a side elevational view, partly in section, of the machine tool shown in Figure 1.

Referring to the drawings and particularly to Figs. 1 and 2, the invention is shown as applied to a vertical turret lathe including a standard S to the bottom of which is integrally joined a base B. A work-supporting table W is mounted on the top of the base B and is provided with a vertical spindle journaled in bearings within said base. A head-stock transmission H (Fig. 2), within standard S, receives its power from a motor (not shown) and drives the rotatable work-supporting table W at a plurality of speeds. A turret head T, adapted to support a plurality of tools for performing metal-working operations, is mounted on the front of the standard S for reciprocation along intersecting paths. A feedworks F (Fig. 1) is mounted on the standard S, in operative position relatively to the turret T, and is adapted to provide a power transmission for moving the turret T along its intersecting paths at a plurality of speeds for feeding the turret during a cutting operation, and at a constant, relatively rapid traverse speed for moving the turret T into and out of operating position relatively to the work on the table W. The power for the feedworks F is supplied from the headstock transmission H through suitable gearing and shafts which pass through a gear bracket G, located on the top of the standard S, thence outwardly and downwardly into the feedworks F.

A control unit C is attached to the feedworks F and is adapted to automatically control the operation of the feedworks F for reproducing every direction and rate, or sequence of directions and rates of movement of said turret head that can be accomplished with the apparatus by an individual.

Referring to Figs. 1 and 2, the standard S comprises a substantially hollow casting 10 having bearings 11 along opposite inner walls for supporting the headstock transmission H. The base B comprises a substantially cylindrical hollow portion 12 cast integrally with the lower portion of the standard S. The work-supporting table W comprises a circular disc 13, provided with radially-disposed grooves 14 within which chucking members are adapted to be mounted for engaging the work.

The headstock transmission H comprises a housing 15 having bearing portions 16 that engage the supports 11 within the standard S. The transmission H forms no part of the present invention. It is fully described and claimed in co-pending application, Serial No. 306,122, filed November 25, 1939, in the name of Edward P. Bullard III et al. The transmission H, therefore, will be described only in so far as it is necessary to show its relation with respect to certain features of the present invention. Various gear combinations within the transmission H are adapted to be engaged by the operation of gear-shifting levers 17 and 18 mounted on the forward end of a gear-shifting bracket 19. When a preselected gear combination is engaged, a combined brake and clutch 20 is adapted to be shifted to disengage the brake and engage the clutch by a shift lever 21. The transmission H is adapted to drive a bevel gear 22 at a plurality of different speeds. The gear 22 meshes with a bevel ring-gear 23 fixed to the lower surface of the work-supporting table W.

The tool-supporting turret T comprises a member 24 rotatably mounted on a pin fixed to the lower end of a turret slide 25 adapted to be reciprocated in guide bearings 26 formed in a swivel 27. The swivel 27 is mounted on a saddle 28 having an arcuate bearing groove 29 within which a connecting element of the swivel is adapted to fit. Limited oscillatable movement of the swivel 27 may be obtained by rotating a worm 30 that meshes with a rack 31 on the saddle 28. The saddle 28 is supported on a slide bearing 32 of a cross-rail 33. The cross-rail 33 is mounted for vertical reciprocation along guide bearings 34 formed on each side of the standard S.

The turret T is moved horizontally along the slide bearing 32 of the cross-rail 33 by a horizontally-disposed screw 35, threaded into a boss 36 on the back of the saddle 28. Reciprocation of the turret head T along bearings 26 is effected by the rotation of a screw 37 journaled in a bearing (Figs. 2 and 9) in the lower end of swivel 27, and threaded into an internally-threaded boss 39 fixed to the back of the slide 25 near the top thereof. The rotative movement of the screw 37 is derived from a rotatable shaft 40, all as more fully described in application Serial Number 345,772. Accordingly, rotation of the screw 35 will effect movement of the turret head T horizontally, and rotation of the splined shaft 40 will cause reciprocation of said head within bearings 26.

Rotative power for shafts 35 and 40 is provided by the feedworks F, rigidly mounted on one end of the cross-rail 33. Since the shafts 35 and 40 are adapted to be rotated at variable speeds that bear a definite relation to the rotation of the work-supporting table W, as well as to be rotated at a substantially constant, relatively rapid speed, two independent sources of power must be supplied to the feedworks F. Accordingly, the transmission H is provided with a driving gear 46 fixed to its driving shaft at the power input side of the transmission adjacent the combined clutch and brake 20. The gear 46, therefore, rotates at a constant speed irrespective of the speed at which the transmission H drives the work-supporting table W. The driving gear 46 meshes with a spur gear 47 fixed to one end of a shaft 48. The opposite end of shaft 48 is provided with a bevel gear 49 that meshes with a bevel gear 50 fixed to one end of vertically-disposed shaft 51. An additional driving gear 52 is adapted to mesh with a gear 53 fixed to the driven shaft of the transmission H adjacent the power output side thereof. Accordingly, the driving gear 52 is adapted to be rotated by the transmission H at a speed directly related to the speed at which the work-table W is driven. The driving gear 52 is fixed to a stub shaft 54 which supports a bevel pinion 55 at its opposite end. The bevel pinion 55 meshes with a bevel pinion 56 fixed to the lower end of a shaft 57. The shafts 51 and 57 are located directly above the transmission H approximately at the center of the standard S. These shafts extend vertically upwardly through the top of standard S into the gear-bracket G. Referring to Fig. 3, the gear-bracket G comprises a housing in the bottom of which bevel gears 58 and 59 are adapted to be journaled. The gears 58 and 59 are fixed to the upper ends of shafts 51 and 57 respectively, and mesh with the bevel gears 60 and 61 keyed to a pair of parallel horizontally-disposed shafts 62 and 63. The parallel shafts 62 and 63 extend outwardly beyond the side of the standard S and are provided at their outer ends with bevel gears 64 and 65 that mesh with bevel gears 66 and 67 keyed to the upper ends of vertically-disposed parallel driving shafts 68 and 69. The shaft 68 transmits rotary power from the transmission H to the feedworks F for moving the turret head T along its intersecting paths at a relatively rapid, substantially constant speed. The shaft 69 is adapted to transmit rotary power to the feedworks F for moving the turret head T along its intersecting paths at a plurality of relatively slow speeds. Both of the shafts 68 and 69 are splined throughout substantially their entire lengths to continuously supply rotary power to the feedworks F as the latter moves vertically with the movement of the cross-rail 32.

The feedworks F comprises a substantially rectangular box-like housing 70 (Fig. 1) adapted to be hermetically sealed and to contain sufficient lubricant to keep the transmission gears submerged in oil, thereby insuring adequate lubrication, noiseless operation and preventing dust and dirt from entering the transmission. The housing 70 is provided with substantially cylindrical bosses 71 and 72 (Figs. 2 and 7) through which the vertically-disposed shafts 68 and 69 are adapted to pass.

Referring to Fig. 4, a bevel gear 73 is journaled in the cylindrical boss 72 and splined to the shaft 69. The bevel gear 73 meshes with a bevel gear 74 keyed to a shaft 75. A portion 76 of the shaft 75 is splined to receive slidable gear units 77 and 78. The gear units 77 and 78 are adapted to be selectively meshed with three gear units 79, 80 and 81 keyed to a shaft 82 parallel with shaft 75. The single gear of unit 79 is adapted to mesh with one gear of unit 77; and the gear unit 80 is provided with two gears, one of which is adapted to be meshed with a gear of the sliding unit 77 and the other with a gear of the sliding unit 78. The gear unit 81 is provided with a gear adapted to be meshed with one of the gears of the slidable unit 78. From an inspection of Fig. 4, it is apparent that selective shifting of the slidable gear units 77 and 78 will provide four separate and distinct rotative speeds of shaft 82 from a single speed of shaft 75.

The rotative speeds provided by the transmission H for the feedworks F require substantial reduction before they can be employed for feeding the turret head T during a working operation. Accordingly, a speed reduction unit is contained within the transmission of the feedworks F. The construction and arrangement is such that the speed of shaft 75 is reduced through a plurality of successive steps, at each of which a different driving rate for the feedworks F is produced. The shafts 75 and 82 of Fig. 4 are extended to support the speed-reduction unit of the transmission. The gear unit 81 on the shaft 82 includes a relatively small gear 83 in constant mesh with a relatively large gear 84 freely journaled on the extension of shaft 75. Another relatively small gear 85 integral with gear 84 is constantly in mesh with a relatively large gear 86 freely journaled on the extension of shaft 82. A third relatively small gear 87, integral with gear 86, is also constantly in mesh with a relatively large gear 88 freely journaled on the shaft 75. The arrangement of gears 84, 85, 86, 87 and 88 may be continued indefinitely to provide any desired number of successive steps of speed reduction. In the present instance, three steps are provided, each of which bears a definite relation to the preceding and the following. A driven shaft 89 is located within the feedworks F in parallel relation with the shafts 75 and 82. Shaft 89 is actually in front of shaft 82 (Fig. 6), but for clarity, Fig. 4 discloses shaft 89 above shaft 82. A pair of gears 90 and 91 are splined to the shaft 89. Movement of the gear 91 to the right as viewed in Fig. 4 will provide four separate and distinct speeds of shaft 89 upon selectively shifting the gear units 77 and 78. Movement of gear unit 91 to the left will produce an additional four speeds of shaft 89 which speeds are reduced by the gear ratio of gears 83, 84, 85 and 86, constituting the first step of the speed-reduction unit. Shifting gear 90 to the right will produce an additional four speeds upon selectively shifting gears 77 and 78. These speeds will be further reduced corresponding to the second speed-reduction step of the unit; and shifting gear 90 to the left will produce a final four speeds of shaft 89 at the lowest rate the speed-reduction unit shown can accomplish. Accordingly, shaft 89 is adapted to be driven at sixteen separate and distinct speeds by selectively shifting the gears 77, 78, 91 and 90.

The sixteen speeds of the shaft 89 derived from shaft 69, as well as the substantially constant speed of the shaft 68, are adapted to be transmitted to the driven shafts 35 and 40 for controlling the movement of the turret head T along its intersecting paths. Furthermore, shafts 35 and 40 are adapted to be driven in both directions at a plurality of speeds of shaft 69 and the substantially constant speed of shaft 68. In the present instance, this has been accomplished by providing a transmission including a driving shaft for each of the driven shafts 35 and 40 and a pair of auxiliary shafts, all of which support the transmitting and the reversing mechanism.

Figure 5:
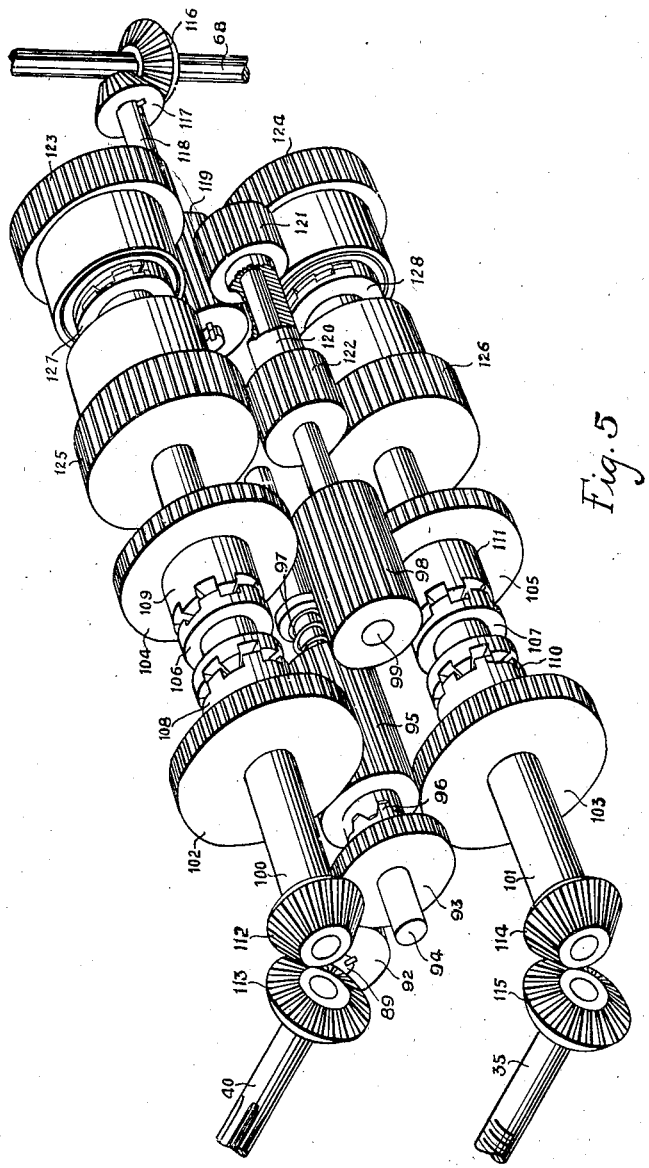
Figure 5 is a perspective view of the internal construction of the feedworks unit.
Figure 6:
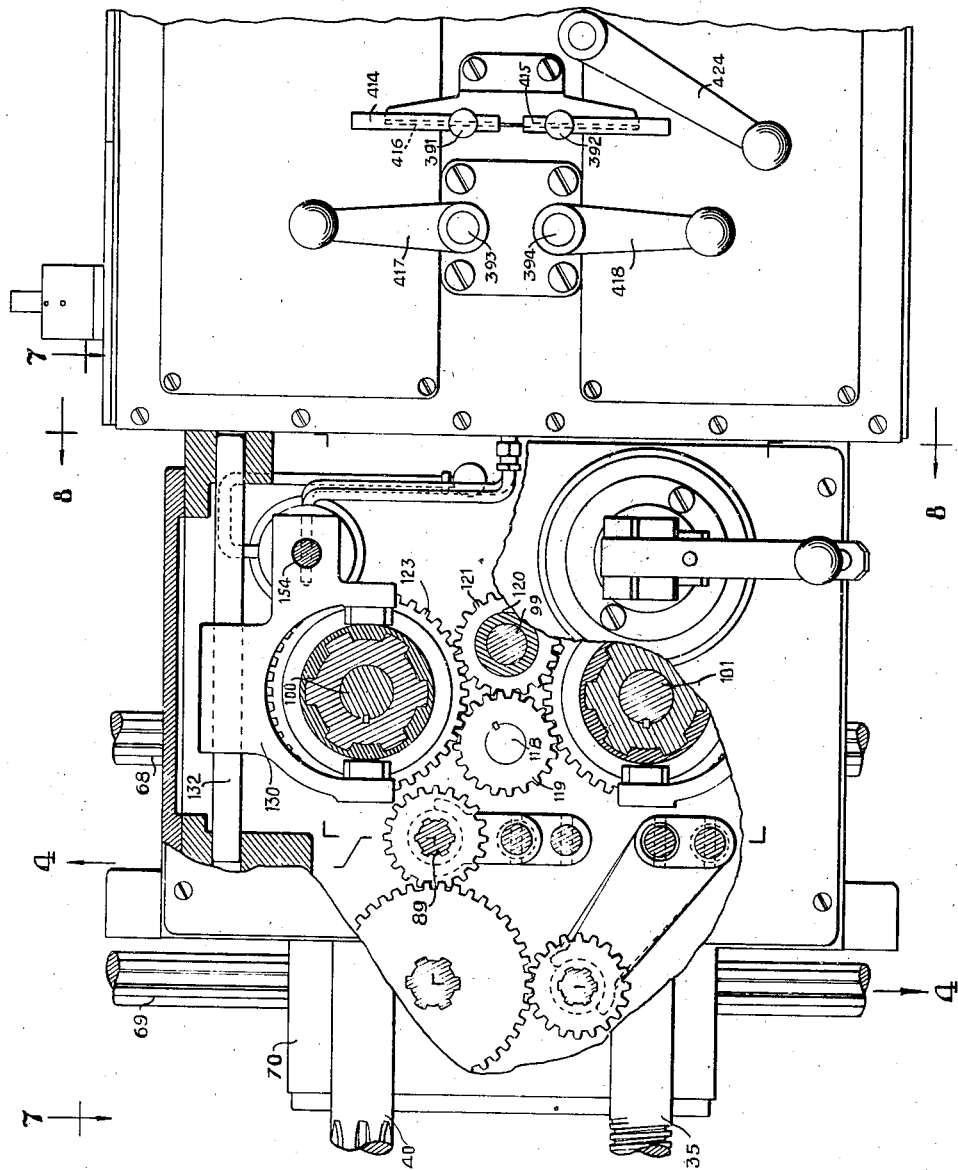
Figure 6 is a front elevational view of the feedworks bracket with parts removed showing an end elevational view of the gearing disclosed in Figures 4 and 5.

Referring to Figs. 5 and 6, and particularly Fig. 5, the driven shaft 89 is provided with a gear 92 keyed thereto and adapted to constantly mesh with a gear 93 journaled on an auxiliary shaft 94. The gear 93 is adapted to drive a relatively long gear 95 likewise journaled on the shaft 94. An over-load clutch 96 is provided between the gears 93 and 95, urged into engagement by a spring 97 surrounding shaft 94. The relatively long pinion 95 is adapted to partially overlie and mesh with a similar relatively long pinion 98 freely journaled on another auxiliary shaft 99. The auxiliary shafts 94 and 99 are located in a substantially horizontal plane. A pair of driving shafts 100 and 101 are arranged in a substantially vertical plane that intersects the horizontal plane midway between the shafts 94 and 99. The shafts 100 and 101 are provided with a pair of driving gears 102 and 103 that are constantly in mesh with the relatively long pinion 95 on the auxiliary shaft 94; and a pair of driving gears 104 and 105 in constant mesh with the relatively long pinion 98 on the auxiliary shaft 99. Gears 102 and 104 are adapted to be rotated in opposite directions from that of gears 103 and 105, and by selectively connecting gears 102, 103, 104 and 105 to the shafts 100 and 101, it is apparent that said driving shafts may be driven at sixteen different speeds in either direction upon selectively shifting the gears 77, 78, 90 and 91 of the variable speed unit. (Fig. 4). Positive-action axially-shiftable clutch members 106 and 107 are splined to the driving shafts 100 and 101, respectively. The slidable, positive-action clutch-engaging means are adapted to cooperate with mating clutch elements 108, 109, 110 and 111 on the gears 102, 104, 103 and 105, respectively. The driving shafts 101 and 100 are adapted to drive the screw shaft 35 and the splined shaft 40, respectively, for controlling the movement of the turret head T. Accordingly, intermeshing bevel gears 112 and 113 are fixed to the driving shaft 100 and splined shaft 40, respectively, and intermeshing bevel gears 114 and 115 are adapted to be keyed to the driving shaft 101 and the screw shaft 35, respectively.

The driving shafts 100 and 101 are adapted to be rotated in opposite directions at a constant, rapid traverse speed to move the turret head T toward and away from the work preparatory to a working operation. Accordingly, a bevel gear 116 journaled in the substantially cylindrical boss 71 of the housing 70 is splined to shaft 68. Gear 116 is adapted to mesh with a bevel gear 117 integral with a stub shaft 118 that is coaxial with the auxiliary shaft 94. A relatively long pinion 119 is adapted to be keyed to the stub shaft 118. A relatively long sleeve gear 120, provided with gear portions 121 and 122, is adapted to be journaled on the auxiliary shaft 99—the gear portion 121 meshing with the relatively long pinion 119. Accordingly, pinion 119 and gear 120 are rotated in opposite directions. Gears 123 and 124, journaled on the driving shafts 100 and 101, respectively, are maintained in constant mesh with the pinion 119; and similar gears 125 and 126, journaled on the driving shafts 100 and 101, respectively, are adapted to be maintained in constant mesh with the gear portion 122 of the sleeve gear 120.

Axially-shiftable positive-action clutch members 127 and 128 (similar to clutch members 106 and 107) are splined to the driving shafts 100 and 101, respectively, between the gears 125, 123 and 126, 124. The clutch members 127 and 128 are adapted to engage corresponding or mating clutch members on adjacent sides of gears 125, 123 and 126, 124 respectively. Accordingly, by selectively shifting the clutch members 127 and 128, it is possible to drive the driving shafts 100 and 101 in either direction at a constant, relatively-rapid traverse speed.

Figure 7:
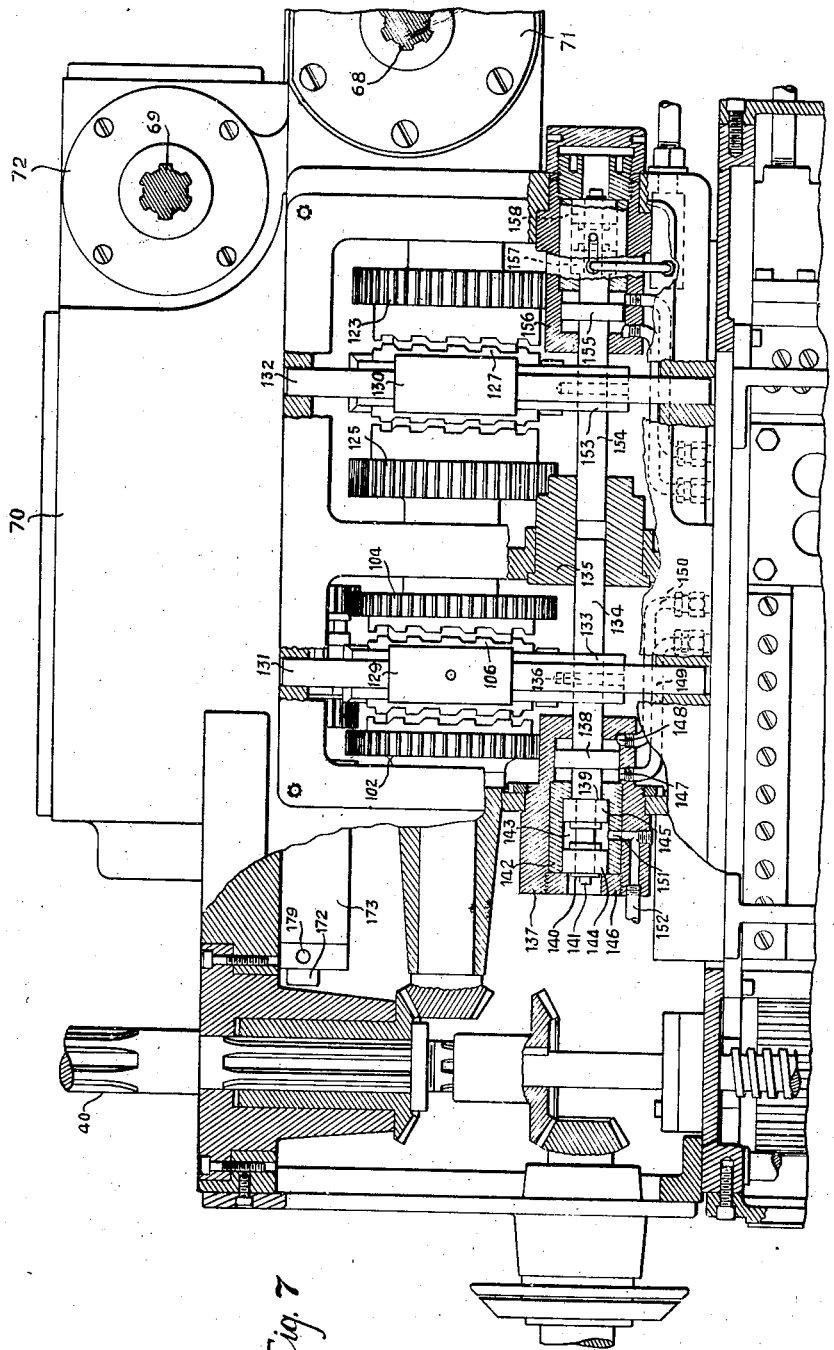
Figure 7 is a sectional plan view with certain parts being broken away to show others, and taken substantially along line 7—7 of Figure 6.

The mechanism for selectively shifting the clutch elements 106 and 127 is identical with that for shifting the elements 107 and 128, and for that reason, only the shifting mechanism for the clutch elements 106 and 127 will be described. Referring to Figs. 6 and 7, shiftable elements 106 and 127 are provided with yoke elements or members 129 and 130, respectively. The yoke 129 is oscillatably mounted on a shaft 131 within the housing 70. In a similar manner, the yoke 130 is oscillatably mounted on a shaft 132. The yoke member 129 is provided with an arm 133 bored to receive a shaft 134 that is journaled in a bearing 135 mounted in the housing 70. The bore that receives shaft 134 is slightly larger than the diameter of the shaft providing a loose connection, and a pin 136 is provided between the arm 133 and the shaft 134. The looseness between the bore of arm 133 and the shaft 134 is necessary to accommodate the angularity produced by the oscillatable movement of the yoke member 129. The shaft 134 extends from the left side of the arm 133 (Fig. 7) into a cylinder 137, within which a piston 138, fixed to the shaft 134, is adapted to be reciprocated. The portion of shaft 134 that extends within the cylinder 137 is reduced in diameter to provide a shoulder 139, and a plate 140 of slightly larger diameter than the reduced diameter of the shaft 134 is fixed to the end of shaft 134 within cylinder 137 by a locking bolt 141. An auxiliary cylinder 142 is mounted within the cylinder 137 and forms a chamber 143 within which piston members 144 and 145 are adapted to reciprocate. The members 144 and 145 are loosely mounted on the reduced diameter of the shaft 134. The piston member 144 is adapted to abut against the plate 140 as well as against a ring member 146 that holds the auxiliary cylinder 142 in place. The piston member 145 is adapted to abut against the shoulder 139 formed between the reduced diameter of shaft 134 and its largest diameter. The cylinder 137 is provided with ports 147 and 148 on opposite sides of the piston 138. The ports 147 and 148 are connected to conduits 149 and 150 that communicate with a source of fluid under pressure. The auxiliary cylinder 142 is provided with a port 151 between the piston members 144 and 145. Port 151 communicates with a line 152 which latter communicates with a source of fluid under pressure.

Fluid, preferably liquid, under pressure is adapted to be supplied to the conduit 152 at all times thereby tending to separate the piston members 144 and 145 so that the yoke 129 is always urged towards a neutral position. Fluid under pressure is adapted selectively to be supplied to conduits 149 and 150 by mechanism to be described later, for shifting the piston 138 to the right or left thereby shifting the yoke 129 to effect engagement between the clutch 106 and the gears 104 and 102. It is to be noted that the area of the piston 138 on which the fluid under pressure is adapted to act is substantially greater than the area of the piston members 144 and 145 against which said fluid pressure is adapted to act. Accordingly, although a constant supply of fluid under pressure is delivered through the conduit 152, tending to neutralize the clutch 106, any admission of fluid under pressure to either side of the piston 138 will cause it to move in the selected direction and upon release of such pressure the clutch 106 is immediately returned to neutral position due to the action of the piston members 144 and 145.

In a like manner, the yoke member 130 is provided with an arm 153 fixed to a shaft 154 in the same manner that shaft 134 is fixed to arm 133. Shaft 154 is likewise provided with a piston 155 that reciprocates within a portion of a cylinder 156, and neutralizing pistons 157 and 158 are provided for the yoke 130 which function in an identical manner with piston members 144 and 145. Fluid under pressure is adapted selectively to be admitted to opposite sides of the piston 155 while a constant source of fluid under pressure is delivered between the pistons 157 and 158 at all times.

Figure 8:
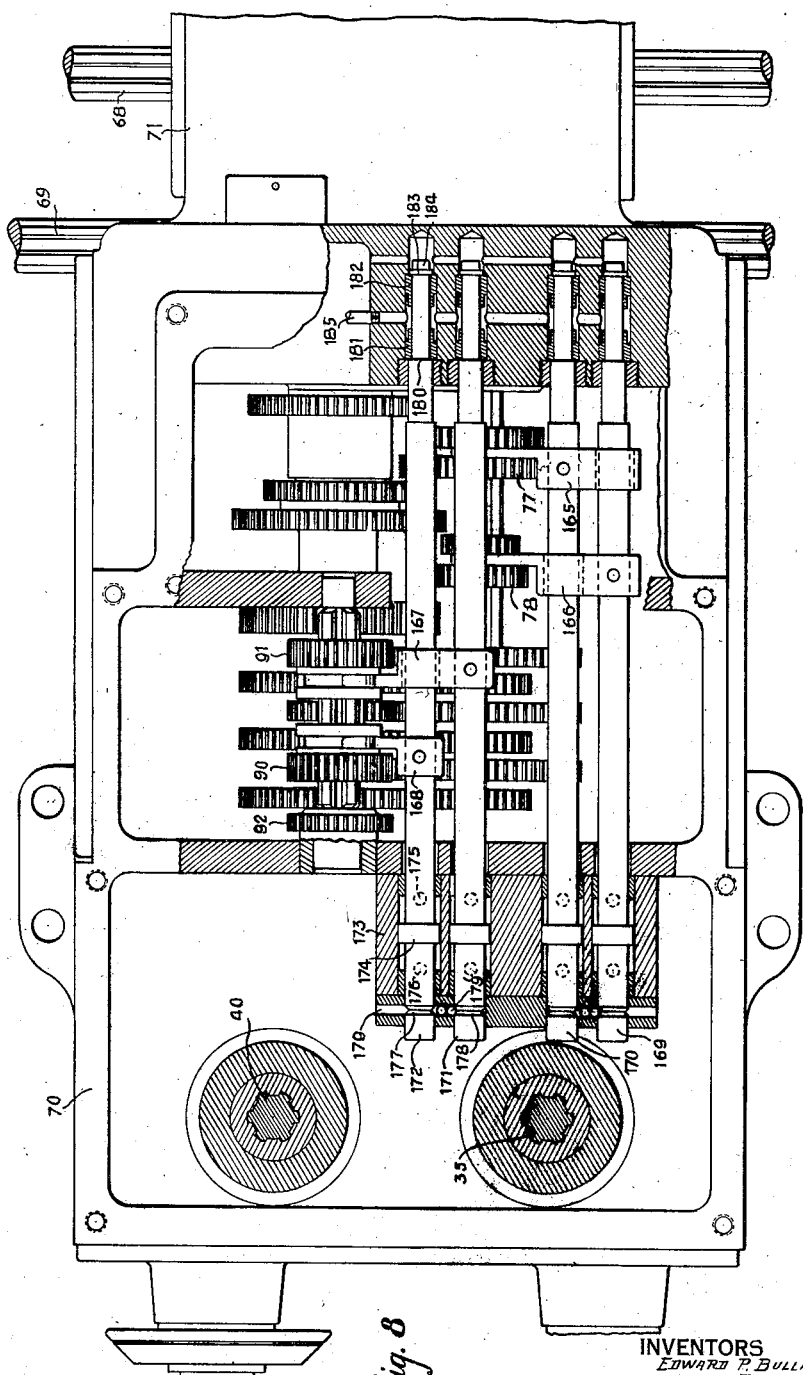
Figure 8 is an elevational view taken substantially along line 8—8 of Figures 1 and 6.

Referring to Fig. 8, the shiftable elements 77, 78, 91 and 90 which are adapted, upon shifting, to provide sixteen different speeds of rotation of the gear 92 (Fig. 5), are adapted to be shifted by the movement of finger elements 165, 166, 167 and 168. Four parallel rods 169, 170, 171 and 172 are mounted for reciprocation in bearings within the housing 70. The finger element 165 is pinned to the rod 170; the finger element 166 is pinned to the rod 169; the element 167 is pinned to the rod 171; and the element 168 is pinned to the rod 172. Accordingly, selective axial movement of the rods 169 to 172, inclusive, will effect selective shifting of the slidable gear units 77, 78, 91 and 90.

Since each of the rods 169 to 172, inclusive, is adapted to be shifted axially in the same manner by identical means, only the means for shifting rod 172 will be specifically described. The rod 172 is adapted to extend into a cylinder 173, and a piston 174 is fixed to rod 172 for reciprocation within said cylinder. Ports 175, 176 are provided in the cylinder 173 for selectively admitting fluid under pressure to opposite sides of the piston 174. The end of the rod 172 nearest the piston 174 is provided with a groove 177 that is adapted to cooperate with a groove 178 in the end of rod 171 adjacent to rod 172. A drilled passage 179 is provided in the housing for the cylinders 173, and balls 179' are located within the passage 179. The construction is such that neither of the rods 171 or 172 can be shifted from its neutral position if the other rod is out of its neutral position.

The portion of the rod 172 at the end thereof opposite that to which the piston 174 is connected, is reduced in diameter forming a shoulder 180 against which a loosely mounted piston member 181 is adapted to abut. An additional piston member 182 on the reduced portion of the shaft 172 is adapted to engage a plate 183 fixed to the end of shaft 172 by a locking bolt 184. The area of piston members 181 and 182 is substantially less than that of piston 174. A line 185 is connected to a drilled passage in the housing surrounding the cylinder within which the piston members 181 and 182 are adapted to reciprocate, so that fluid under pressure may be constantly delivered into the cylinder within which said piston members reciprocate. Each of the rods 169 to 172, inclusive, is provided with the same type of neutralizing mechanism which is substantially the same as that disclosed in connection with the rods 134 and 154 of Fig. 7. The passage to which line 185 is connected extends completely through that portion of the housing member in which the cylinders are provided for the respective neutralizing mechanism so that at all times, fluid under pressure is adapted to act upon the individual piston elements thereof. Accordingly, upon the selective admission of fluid under pressure to the opposite sides of the pistons 174 on the respective rods 169 to 172, inclusive, said rods will be axially moved in the direction dictated by the sides of the pistons against which the fluid is directed, and, immediately upon the release of such pressure, each of the neutralizing mechanisms for the rods 169 to 172, inclusive, will automatically shift into neutral the shiftable gear units 77, 78, 91 and 90 with which said rods are associated.

Figure 9:
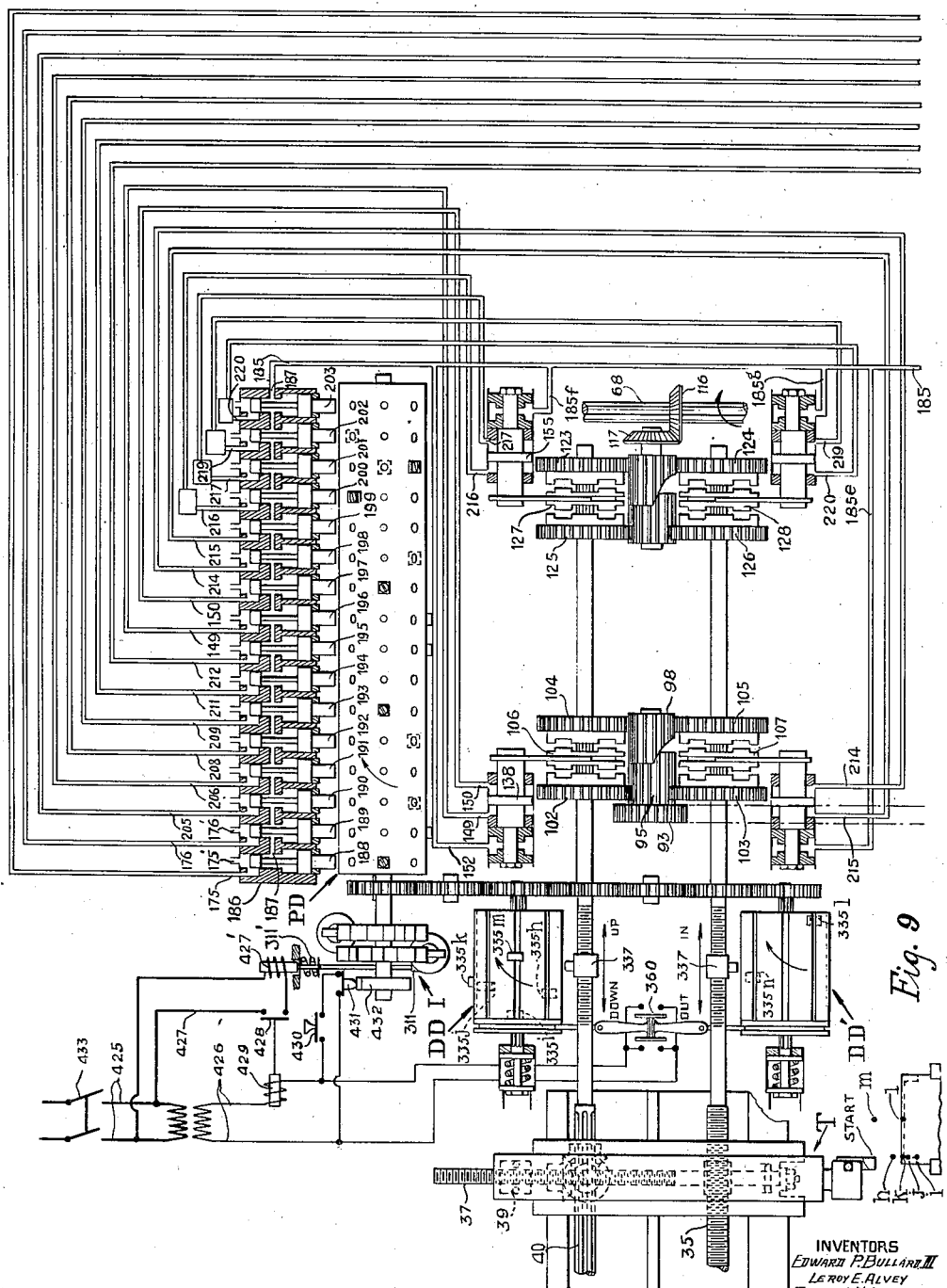

For a better understanding of the fluid system that interconnects the fluid motors attached to clutches 106, 107, 127 and 128, as well as those attached to the gear-shifting rods 169, 170, 171 and 172, attention is directed to Figures 9 and 10 in which the apparatus is schematically disclosed. Referring to said figures, a valve body 186, provided with a plurality of valve plungers 188 to 203, inclusive, is adapted to be supplied with liquid under pressure from a source S (Fig. 10) through the line 185. The valve body 186 is provided with a passage 187 extending longitudinally therethrough for supplying all of the bores for valves 188 to 203 with liquid under pressure. The valve plungers 188 to 199, inclusive, are identical, while valve plungers 200 to 203, inclusive, are identical but different from the former group. One valve of each of these groups will be specifically described later. For the present, it is only necessary to note that each valve plunger is provided with a supply line and an exhaust.

The bore for valve plunger 188 is connected to the one end of line 175, the opposite end of which is connected to the right-hand side of the cylinder in which piston 174 is adapted to reciprocate (Fig. 10). The bore for valve plunger 189 is connected to the one end of line 176, while the other end of said line is connected to the left-hand side of the cylinder in which piston 174 is adapted to be reciprocated. The line 185 which continuously supplies fluid under pressure to the valve body 186 also continuously supplies fluid under pressure to the cylinder in which piston elements 181 and 182 are adapted to be reciprocated. As previously pointed out, the effective areas of pistons 181 and 182 are substantially less than that of piston 174. Therefore, with valve plungers 188, 189 in their lower position as shown in Fig. 9, lines 175 and 176 are open to exhaust ports 175', 176', and the pressure fluid that continuously acts on piston members 181, 182 maintains piston 174 midway of its stroke and gear element 90 in neutral. Movement of either valve 188 or 189 to its upper position cuts off the exhaust and admits liquid under pressure to either side of piston 174, thereupon gear 90 moves to the right or left depending upon which valve, 188 or 189, is raised.

In a like manner, valve plungers 190, 191 control the admission of liquid under pressure to, and exhaust from both sides of piston 204 through lines 205, 206, and consequently the shifting of gear 91; valve plungers 192, 193 control the flow of liquid through lines 208, 209, and consequently the movement of gear 78; valve plungers 194, 195 control the flow of liquid through lines 211, 212, and consequently the movement of gear 77; valve plungers 196, 197 control the flow of liquid through lines 149, 150, and consequently the movement of clutch 106; valve plungers 198, 199 control the flow of liquid through lines 214, 215, and consequently the movement of clutch 107; valve plungers 200, 201 control the flow of liquid through lines 216, 217, and consequently the movement of clutch 127; and finally, valve plungers 202, 203 control the flow of liquid through lines 219, 220, and consequently the movement of clutch 128.

Not only is the line 185 adapted continuously to supply liquid under pressure to valve body 186 and the cylinder within which piston elements 181, 182 reciprocate, but it is also adapted continuously to supply liquid under pressure to similar neutralizing mechanisms for gears 91, 78, 77 and clutches 106, 107, 127 and 128. Accordingly, line 185 is provided with branch conduits 185a, 185b, 185c, 185d, 185e, 185f, 185g and 152 adapted continuously to supply liquid under pressure to the neutralizing mechanisms for gears 78, 77, 91, 90 and clutches 107, 127, 128 and 106, respectively.

From the foregoing it is apparent that selective actuation of valve plungers 188 to 203 will effect the selective rotation of screw 35 and shaft 40 in either direction at any one of sixteen feed speeds or at a relatively rapid traverse rate, and consequently the selective movement of tool head T along either of its intersecting paths.

Valve plungers 188 to 203 are normally urged toward their downward positions. They are, however, adapted selectively to be moved to their upper positions by a pattern drum PD (Fig. 9) on which dogs are adapted to be located in accordance with the desired sequence of operations of head T. Drum PD is adapted to be indexed step-by-step about a horizontal axis by mechanism I—each index setting up the same or a different gear combination within the feedworks for performing an operation by head T. The indexing of drum PD is adapted to be determined by any pre-selected position the head T may assume along its paths of travel. Accordingly, a distance-determining drum DD is provided for the shaft 40 and a similar drum DD' is provided for screw 35. These distance-determining drums are provided with means for supporting in axially adjustable positions as many dogs about their peripheries as there are dogs about the periphery of pattern drum PD. Drums DD and DD' are also mounted for slight axial movement, which movement is caused by cooperation between the dogs thereon and a nut movable in proportion to that of head T. This slight axial movement of drums DD, DD' is employed to close a circuit for effecting the indexing of drum PD. Additionally all three drums are geared together so that upon indexing drum PD, drums DD and DD' are indexed. This arrangement enables the selection of the path, speed, direction, starting and stopping of head T for each operation it is adapted to perform because there is a single independent portion of drums DD and DD' for each index, and a single index is employed for a single operation of head T.

The control C (Fig. 1) for the feedworks F comprises the drums PD, DD, DD' and their attending structures including valves 188 to 203, indexing mechanism I, etc. Referring to Figures 11, 12 and 13, the control C is contained within a housing including a back plate 221 that is rigidly bolted to the housing 70 of the feedworks F. Side plates 222, 223 are rigidly fixed to the plate 221, and a front plate 224 is joined to the outermost edges of plates 222, 223. Top and bottom cover plates 225, 226 complete the housing for the control C.

Referring to Fig. 13, the valve body 186 includes flanges 227, 228 rigidly attached to the back plate 221 over an opening 229 formed in the latter. A block 230, containing conduits for the passage of liquid under pressure controlled by valve plungers 188 to 195 is secured to the back of body 186 and extends into the feedworks housing 70 through the opening 229. Lines such as 208 connect the conduits within block 230 to the various cylinders such as that containing piston 207 (Fig. 10). Arms 231, 231', 232 and 232' (Fig. 12) support a bracket 233 within which auxiliary pusher elements 234 (Fig. 13, to be described later) are adapted to reciprocate freely. There is a pusher element 234 for, and in line with each of valve plungers 188 to 203, inclusive. The outer end of each element 234 is beveled in two directions for facilitating cooperation with dogs on the pattern drum PD.

As previously mentioned, valve plungers 188 to 199 are identical. The valve plunger 192 will be the only one specifically described. The plunger 192 is adapted to be reciprocated in a bore including a portion 235 of smaller diameter and a portion 236 of larger diameter. A portion 237 of plunger 192 fits the large-diameter bore and a head 238 fits the smaller-diameter bore. A stem 239 connects portion 237 to 238. The body 186 is provided with a duct 240 that communicates with line 208 and bore 235. The left-hand extremity of bore 235 communicates with an exhaust passage 241 formed in the block 230 and emptying into the housing for control C. Liquid under pressure from line 187 enters bore 235 and since the area of portion 237 of valve 192 is greater than the area of the head 238, said valve and pusher member 234 are urged rightwardly thereby exhausting line 208 to exhaust passage 241. Movement of pusher member 234 to the left either by a dog on drum PD or by hand (to be described later) positions head 238 to cut off communication between line 208 and exhaust passage 241, and establishes communication between line 187 and line 208, whereupon liquid under pressure passes through line 208 and acts on the left-hand face of piston 207 (Fig. 10) moving it to the right and shifting gear cluster 78 into mesh with gear cluster 80. Upon release of the force that holds the member 234 for valve 192 in its leftward position, the liquid under pressure in bore 235 moves valve 192 and member 234 rightwardly thereby exhausting line 208 and consequently, the neutralizing mechanism for piston 207 (Fig. 10) moves gear cluster 78 into neutral.

All of the valves 188 to 191, inclusive, and 193 to 199, inclusive, are identical to valve 192, just described. Valves 200 to 203 are employed for shifting the traverse clutches of the transmission. Traverse movement of head T is usually employed immediately following a cutting movement. Accordingly, to insure the tool completing the cut, a time-delay device is combined with each valve 200 to 203, inclusive. All valves of this group are identical and since certain passages are common to each pair, valves 200 and 201 will be the only ones described specifically.

Referring to Figs. 14, 15 and 16 and particularly to Fig. 14, valve 200 is identical with valve 192. Liquid under pressure from duct 187 urges valve 200 toward the right into engagement with a pusher element 234' substantially the same as pushers 234. The body 186 is adapted to support a housing member 242 provided with cylindrical bores 243, 244 within which piston elements 245, 246 are adapted to reciprocate. A cover plate 247 for housing 242 is open above bores 243, 244 for the passage of pistons 245, 246 beyond the upper extremity of said housing. The pistons 245, 246 comprise elongated portions having flanges 248 and bosses 249 at their lower extremities. A collar 250 is located at the top of each bore 243, 244 against which the flange 248 of each piston abuts to limit the upward travel of each of said pistons. A rod 251 extending through housing 242 across bores 243, 244 acts to limit the downward movement of the pistons 245, 246.

Sleeves 252, 253 are located within bores 243, 244 respectively, and the rod 251 extends through the top portions of these sleeves. Additional piston valve members 254, 255 are respectively located within sleeves 252, 253 for reciprocation therein. Each of the piston-valve members comprises a piston portion 256 and a valve head 257. The rod 251 acts to limit the upward travel of members 254, 255, and seats 258, 259, respectively, formed within sleeves 252, 253 limit the downward travel of said members. Liquid under pressure from line 185 (Fig. 16) and passage 187 is continuously supplied to a line 260 (Fig. 14) that communicates with a passage 261 (Figs. 14, 16) which extends through the front wall of housing 242 and a wall 262 between bores 243, 244. The actual connection between passage 187 and line 260 is not shown in the drawings. A passage 263 extends laterally through wall 262 in line with passage 261, through sleeves 252, 253 to the interior thereof and admits liquid to the lower faces of the piston portions 256 of the piston valve members 254, 255. Since the area of these lower faces is greater than that of the upper faces of valve heads 257, piston-valve members 254, 255 are urged upwardly into engagement with rod 251.

A vertically-disposed passage 264 (Fig. 14) also communicates with passage 261 and a passage 265 within wall 262 between bores 243, 244. Passage 265 communicates with each of said bores and admits liquid under pressure to annular spaces 266, 267 surrounding pistons 245, 246. Accordingly, this pressure liquid acts on flanges 248 of said pistons 245, 246 forcing them downwardly until bosses 249 thereof abut rod 251.

Movement of the pusher element 234' for valve 200 to the left (Fig. 14) by hand or by a dog on drum PD, forces said valve leftward whereupon liquid under pressure from duct 187 passes through a duct 268, thence through a passage 269 into the bore 243 between piston 245 and 254. Since the area of piston 245 is greater than that of piston portion 256, the former moves upwardly to the top of its stroke before the latter moves downwardly. The rate of upward movement of piston 245 and consequently the extent of time-delay may be varied by controlling the degree of leftward movement imparted to pusher 234' by varying the height of the dog on drum PD. When piston 245 reaches its upper limit, piston-valve member 254 moves downwardly whereupon its valve head 257 permits liquid from passage 261 to flow through a duct 270 to line 216, thence to the left-hand side of piston 155 (Fig. 9) shifting clutch 127 into engagement with gear 123.

Upon release of the force holding valve 200 in its leftward position, liquid from passage 187 forces it and pusher 234' rightwardly opening duct 268 to an exhaust port 271, and thereby exhausting the liquid from between pistons 245 and 254. When this occurs, piston 245 moves downwardly and piston 254 upwardly into abutting relation with rod 251. Upward movement of piston 254 opens duct 270 to an exhaust passage 272 between housing 242 and body 186. Accordingly, the neutralizing mechanism for piston 155 (Fig. 9) thereupon shifts clutch 127 into neutral.

In a similar manner, movement of the pusher element 234' for valve 201 inwardly (Fig. 16) will effect the admission of liquid under pressure after a predetermined time-delay to line 217, thence to the right side of piston 155 to shift clutch 127 into engagement with gear 125.

A housing 273 identical with housing 242 and containing identical time-delay mechanism is also provided for valves 202 and 203.

Referring to Fig. 12, a plate 274 is attached to the bracket 233 above the valves 188 to 203. The plate 274 is provided with the letters A, B, C and D respectively, above valves 188 to 191, inclusive. A vertically-disposed column 275 including letters A to D is located on plate 274 between valves 191 and 192. Above each valve 192 to 195, inclusive, is a vertical column 276 of four feeds each, that will be established within the feedworks transmission upon the actuation of the correct combination of valves 188 to 191 and 192 to 195. The plate 274 is also provided with the proper designations above the feed-clutch valves 196 to 199, inclusive, and the proper designations above the traverse-clutch valves 200 to 203, inclusive.

Accordingly, the selective actuation of pairs of valves from the groups including valves 188 to 191 and 192 to 195 will provide the sixteen different feeds of which the feedworks is capable of establishing and simultaneous selective actuation of valves 196 to 199 will determine the direction in which the head T will be fed at the selected speed. Additionally, selective actuation of the valves 200 to 203 will effect the traverse movement of head T in either direction along either of its paths of motion.

Selective actuation of valves 188 to 203, inclusive, is adapted to be effected by the step-by-step indexing of drum PD on which a desired arrangement of dogs is adapted to be made for effecting desired sequential valve actuations.

Referring to Fig. 11, the drum PD comprises a hollow cylindrical shell 277 in the opposite ends of which spiders 278 are rigidly fixed (only the left-hand spider 278 and its mounting is shown). The spiders 278 are provided with hubs 279 pinned to horizontally-disposed studs 280 that are freely journaled in drilled bosses 281 which latter extend inwardly from plates 223 and 222. The shell 277 is provided with a plurality of circumferentially-disposed series of drilled and tapped holes 282. There may be any desired number of holes 282 in the series, depending upon the size of drum PD, as well as the probable number of functions that may be included in a cycle of operation of the apparatus. In the present embodiment of the invention, thirty tapped holes 282 are provided in each series. Accordingly, drum PD is adapted to be indexed to thirty separate positions in completing a single revolution.

Dogs 283 are adapted to be secured to the drum PD by screws that cooperate with holes 282. The dogs include a base portion 284 that extends over at least two holes 282 in adjacent series, and an actuating portion 285 that lies between two holes 282 in adjacent series. The portions 285 are adapted to be aligned with the pushers 234, 234' of valves 188 to 203 for actuating the same upon indexing drum PD. The drum PD is also provided with circumferentially-arranged series of buttons 286 between valves 191, 192, 195, 196, 199 and 200 for safety reasons. These buttons prevent the incorrect lateral disposition of dogs 283 as well as divide the drum into convenient sections for facilitating its being set.

The dogs 283 are adapted to be pre-set by the operator to provide the sequential operation of the head T for performing a cycle of operation upon the successive indexing of the drum PD.

Each time a new cycle of operation of head T is desired, the dogs 283 are adapted to be rearranged by the operator. This presetting of drum PD is to be distinguished from certain types of automatic machinery in which a predetermined fixed cycle of operation is built into the machine.

The successive indexing of drum PD is effected by the indexing mechanism I (Figs. 11, 12, 17 and 18). Referring to Figs. 11 and 17, the right-hand spider 278 of drum PD is provided with an integral sleeve 287 to which ratchet wheels 288, 289 and 290 are keyed. The ratchet wheel 288 is employed to index drum PD in a counter-clockwise direction (Fig. 17), wheel 290 is employed to index the drum in the opposite direction and ratchet wheel 289 is employed to hold the drum rigidly between indexing movements.

Referring to Fig. 11, a housing 291 is rigidly fixed to bosses 292, 293 integral with side plate 222. The housing 291 includes a bore 294 (Fig. 17) within which a compound piston mechanism 295 is adapted to be reciprocated. The mechanism 295 includes a piston portion 296 in alignment with ratchet wheel 288. A ratchet head 297 is fixed to the forward end of piston 296 and is adapted to cooperate with ratchet wheel 288 to index the same during its forward stroke. The head 297 is pivoted to piston 296 by a pin 298 to render the same articulate. A bolt 299 passing through an elongated slot 300 in piston 296 and anchored in housing 291 limits the stroke of piston 296. The length of slot 300 is such that the stroke of piston 296 effects a complete index of drum PD. The mechanism 295 also includes a piston 301 that is adapted to abut the piston 296 and to move throughout a stroke of one-half the distance of the stroke of piston 296.

Referring to Fig. 18, housing 291 also includes a bore 302 within which a piston 303 reciprocates. Piston 303 is in alignment with ratchet wheel 290. A ratchet head 304 is pivoted to piston 303 for cooperation with wheel 290. A bolt 305 anchored within housing 291 passes through an elongated slot 306 in piston 303 for limiting its stroke. The length of slot 306 is such that the stroke of piston 303 provides a reverse half index for drum PD.

It is evident from the foregoing that selective admission of fluid to, and exhaust from pistons 296, 301 and 303 will index the drum forwardly a complete index, forwardly a half index and rearwardly a half index, respectively. The forward full index is employed during automatic run, the forward half index for stop and the rearward half index for indexing drum PD to the position it was in prior to effecting a forward half index.

A rotary valve 307 is provided in the housing 291 for controlling the passage of liquid to pistons 296, 301 and 303. Figures 17 and 18 show sections of valve 307 at two points along its longitudinal axis. The passages in the section of Fig. 17 control the flow of liquid to pistons 296 and 301, while the passages of the section of Fig. 18 control the flow of liquid to piston 303. The valve 307 is adapted to be rotated by hand in a manner to be described later to four positions disclosed in Figs. 17, 18, 19, 20 and 21. In the position valve 307 is shown in Figs. 17, 18, liquid from the inlet passage 185 (Fig. 11) passes through a duct 308 (Fig. 17), thence through a passage 309 that includes a recessed portion 310 surrounding a valve stem 311, thence through the continuation of passage 309 to an annular space 312 and acts upon the mechanism 295 to move it toward the left thereby moving ratchet head 297 away from wheel 288. Movement of valve 311 upwardly permits the liquid under pressure to pass through the bore for valve 311, thence through a passage 313 in housing 291, thence through a duct 314 in valve 307 and in line with passage 313, thence through a continuation of passage 313 to a chamber 315 where it acts on the left-hand face of piston 296 forcing it rightward to effect a full forward index of drum PD. Simultaneously therewith liquid passes from chamber 315 through a line 316 to a housing 317 having a piston mechanism 318 therein. The piston mechanism 318 includes two separate pistons 319, 320 in abutting relation. The liquid from line 316 enters housing 317 between said pistons 319, 320 forcing the former inwardly, whereupon its forward end portion engages head 297 insuring positive cooperation between it and ratchet wheel 288. Additionally, liquid from the space between pistons 319, 320 passes through a duct 321 into a bore 322 containing a compound piston mechanism 323 including a detent-locking mechanism. The mechanism 323 includes two separate piston elements 324, 325 that abut each other and certain faces of each of which, upon being subjected to the pressure liquid, move a detent plunger 326 out of cooperating position relatively to the ratchet wheel 289 against the action of a spring 327.

In order to snub the forward movement of piston 296 and yet to insure that the first portion of the movement is as rapid as possible, the passage 309 enters chamber 312 at a point such that after piston 296 moves rightward a predetermined distance, the free exhaust of liquid through passage 309 is cut off and the remainder is forced out through a by-pass 309'. The flow therethrough is controlled by a ball 328 that is spring urged against a seat having a scratched surface for bleeding the liquid past ball 328.

From the foregoing it is evident that with the apparatus in the position shown in Fig. 17, each time valve 311 is raised, piston 296 will effect a full forward index of drum PD, thereby successively indexing the same and setting up the conditions within the transmission as dictated by the setting of the dogs 284 on said drum.

Valve 311 is adapted to be raised by an electromagnet (to be described later) that is energized by an electrical circuit which is adapted to be completed in response to the position head T may assume along its path of travel. Accordingly, the distance-determining drums DD and DD' (Figs. 12 and 22) are located adjacent to and parallel with extensions of the shaft 40 and screw 35. Both assemblies for drums DD and DD' are identical. Only that for drum DD' will be specifically described.

Referring to Fig. 22, drum DD' comprises a pair of discs 329, 330 fixed to a shaft 331 that is journaled in bearings 332, 333 formed in the side walls 221, 224 of the housing for control C. A circumferentially-disposed series of strips 334 (Figs. 11, 12 and 22) are fixed to discs 329, 330 forming in appearance, a squirrel cage arrangement. There are as many strips 334 as there are holes 282 (Fig. 11) in a circumferential series about drum PD. Each of the strips 334 represents the distance-determining factor for a setting incident to an arrangement of dogs 283 along an axial series of holes 282 of drum PD. Contacting elements 335 of rectangular shape and having a slot therein for providing leg portions for straddling the strips 334 are adapted to be securely attached to the strips at any desired place along their length by bolts 336. The length of the drums DD and DD' is proportional to the length of travel of head T along its respective paths.

An extension of screw 35 is journaled in bearings formed on the sidewalls of the housing for control C. This extension is provided with screw threads, the pitch of which is such that the movement of a nut 337 thereon is proportional to the movement of the head T along its horizontal path. The nut 337 is guided by two rods 338, 339 (Fig. 12) parallel to the extension of screw 35. The nut is provided with a removable finger portion 340 that is located in a plane through which each of the strips 334 must pass. It is adapted to cooperate with the dogs 335 on each strip as said strip is positioned in alignment with finger 340. The finger 340 is connected to nut 337 by dowel pins and screws so that it may readily be removed for a purpose to be described later.

From the foregoing, it is evident that the movement of nut 337 follows the movement of head T along its horizontal path and that the dogs 335 that cooperate with nut 337 determine the distance head T moves along said path. When nut 337 and a dog 335 engages, the circuit of the solenoid for the valve stem 311 is adapted to be completed for effecting indexing of drum DD. For this purpose, drum DD' is mounted for slight axial movement on either side of a neutral position to which said drum returns instantly upon release of the force that moves it from said neutral position. This slight movement of drum DD' is adapted to effect making the circuit of the solenoid for valve 311. Referring to Fig. 22, the right-hand end of shaft 331 is stepped to provide shoulders 341, 342 and a threaded end 343. A housing 344 is screwed into wall 224 forming a chamber 345 around the stepped end of shaft 331. A pair of collars 346, 347 are loosely mounted on a portion 348 of shaft 331 between shoulders 341 and 342. A nut 349 is screwed to the threaded end 343 of shaft 331 and abuts against shoulder 342. The abutting surface of nut 349 also serves to support collar 347. A spring 350 is mounted on portion 348 of shaft 331 between collars 346 and 347. The construction and arrangement of the foregoing parts are such that slight axial movement of drum DD' to either side of a neutral position may be effected and drum DD' will instantly return to said neutral position upon release of the force that moves it.

Referring to Figs. 22, 23 and 24, the nut 349 is provided with a spool portion 351 that engages a finger 352 of an oscillatable element 353. The element 353 is pivoted by a pin 354, and the end of said element opposite that which contains finger 352 is provided with a V-slot 355 that is adapted to cooperate with a knife-edge 356 on an oscillatable lever 357. The lever 357 is pivoted by a pin 358 and is of a length sufficient to amplify the motion transmitted to it by the slight oscillatable movement of element 353. In the present instance the slight movement of element 353 that is imparted to lever 357 is multiplied ten times and transmitted to a push button 359 that contacts a button 360 of a micro-switch 361. Switch 361 is a commercial item and effects making of the circuit of the solenoid for valve 311 upon a very slight movement (.001") of button 360. It is evident from the foregoing that a very slight movement of drum DD', theoretically .0001", will effect energization of the solenoid for valve 311 and cause drum PD to be indexed.

Drum DD is identical with, mounted, constructed and arranged in the same manner as drum DD'. Drum DD responds to the movement of head T along its vertical path. A similar movement multiplying linkage is provided for drum DD and it likewise cooperates with microswitch 361 for energizing the circuit of the solenoid for valve 311. Only one switch 361 is required in the present embodiment because the machine tool is designed such that during automatic operation, head T moves along either of its paths but not both simultaneously.

As previously mentioned, each axial row of holes 282 on drum PD has a corresponding strip 334 on drums DD and DD'. Therefore, a definite phase relation must be maintained between all three drums. Accordingly, they are adapted to be indexed simultaneously from station to station about their respective axes. Referring to Figs. 11 and 22, a bevel gear 362 pinned to stud 280 to which boss 279 is pinned is adapted to mesh with a bevel gear 363 formed on one end of a sleeve 364 that is pinned to stud shaft 365 journaled in a bearing 366 formed in wall 224. The end of sleeve 364 opposite bevel gear 363 is provided with a spur gear 367 that meshes with idler gears 368, 369. Idler gears 369, 368 mesh with a gear 370 and a similar gear, pinned to the shafts to which drums DD and DD' are fixed, respectively. Idler gears 368, 369 are wide enough to remain in mesh with gear 370 and the similar gear associated with drum DD even when said drums are moved axially a slight amount. An indicator disc 371 is fixed to the end of shaft 365. It contains indices that register with a fixed pointer for indicating at any time the row of longitudinally-aligned holes 282 that are in alignment with the pusher elements 234, 234' of valves 188 to 203 inclusive.

The structure of the control C so far described effects automatic operation of the head T along its intersecting paths. Certain characteristics of this structure are well worth noting, among which include, the pattern drum PD is adapted to be indexed from station to station by a source of power separate from that developed by the movement of head T; that this separate source of power is, however, rendered effective in response to the movement of head T; that the distance-determining drums DD and DD' are adapted to be indexed simultaneously with drum PD and are provided with separate portions each of which has a portion corresponding to a portion of drum PD; that the cooperation between nuts 337 and dogs 336 is such that instantly upon contact between the two, the dogs 336 are adapted to be rendered ineffective relatively to nuts 337, and in the embodiment shown they are adapted to be moved out of cooperating position relatively to nuts 337; and that the combination of the simultaneously movable drums PD, DD, DD' and the instantaneously operable microswitch 361 provides an arrangement whereby the head T may be moved along the same path for different distances in a cycle of operation without affecting the setting of the control to repeat the cycle of operation.

The control C not only effects automatic operation of the machine tool, but also permits manual operation at any time even during an automatic cycle of operation without disturbing the setting of the control for said automatic cycle of operation. Referring to Figs. 17, 18, 19, 20 and 21, valve 307 is adapted to be rotated to four positions, namely that shown in Figs. 17, 18 and those shown in Figs. 19, 20 and 21. With valve 307 in the position shown in Fig. 19 and valve 311 in its upper position, liquid from line 309 passes into duct 313, thence around a recess 372 in valve 307, thence through a passage 373, into the chamber in which piston 301 is located, and acts on the left-hand face of piston 301 forcing it and piston 296 rightward. A wall 374 is provided in the chamber for piston 301 that limits its stroke to a distance such that head 297 indexes drum PD forwardly only a half index thereby removing all dogs 283 from radial alignment with the pusher elements 234, 234' for valves 188 to 203 inclusive. Accordingly, this forward half index will effect stopping of head T. The forward half-index, however, will become effective only upon raising valve 311. Therefore, should valve 307 be moved to the position shown in Fig. 19 while an operation is being performed, nothing will occur until said operation is completed at which time cooperation between a nut 337 and a dog 335 will effect energization of the solenoid for valve 311. At the same time, pressure liquid will pass from the chamber for piston 301 through a line 375 into the bore for piston mechanism 318 forcing pistons 319 and 320 inwardly to insure head 297 properly engaging ratchet 288. Additionally, pressure liquid from line 375 passes through a duct 376 to the bore for piston mechanism 323, forcing detent plunger 325 outwardly to release ratchet wheel 289. In order to snub the forward motion of piston 301, a vent 377 is provided in the chamber for piston 301 at a point such that a small quantity of air will be trapped in the chamber for said piston to cushion its action. Instantly upon moving drum PD forwardly a half index to stop head T at the end of the movement it is undergoing at the time, the dog 335 that cooperated with the nut 337 for completing the solenoid circuit moves out of cooperating position with nut 337 permitting the drum DD or DD' to return to neutral position thereby opening the solenoid circuit and permitting valve 311 to move to its lower position under the influence of a spring 311'.

The valve 307 is adapted to be moved to the position shown in Fig. 20 when it is desired to repeat the last preceding operation of head T. The position shown in Fig. 20, however, will be effective only after the apparatus has been stopped by first setting valve 307 in the position shown in Fig. 19 or that shown in Fig. 21, to be described later. Referring to Figs. 17 and 18, where the valve 307 is shown in position for automatic run, the tooth of head 304 is in a mid-way position between adjacent teeth of ratchet wheel 290 and reciprocation of piston 303 will not be effective to index drum PD. However, when forward half index of drum PD has been effected by moving valve 307 to the position shown in Fig. 19, the relation between the teeth of wheel 290 and head 304 will be that shown in dotted lines (Fig. 18). Since valve 311 is in its lower position as described in connection with the stopping of head T by a forward half index of drum PD, liquid will not pass through ducts 313 and 373, but will pass from passage 308 through ducts 378, 379 into a passage 380 (Figs. 17, 18), thence through ducts 381, 382, thence through a passage 383 (Fig. 20), thence through a continuation of duct 382 to the bore for piston 303. The pressure liquid passes from the bore of piston 303 through a line 384 to the bore of a piston mechanism 385 and forces the head 304 into cooperating engagement with ratchet wheel 290. Additionally, pressure liquid from mechanism 385 passes through a line 386 (Fig. 17) to the piston mechanism for withdrawing detent piston 326 to release ratchet wheel 289. Accordingly, with valve 307 having been first moved to the position shown in Fig. 19 to effect automatic stop by a forward half index of drum PD and then turned to the position shown in Fig. 20, piston 303 will move forwardly, piston mechanism 385 will force head 304 into engagement with a tooth of wheel 290 and detent piston 326 will release ratchet wheel 289, simultaneously, thereby effecting a reverse half index to drum PD and causing a repetition of the function performed by the setting of said drum in its last preceding position.

When for any reason it is desired instantly to stop the transmission of power to head T, such, for example, when a tool breaks or inspection of work is desired, it is only necessary to move valve 307 to the position shown in Fig. 21, whereupon pressure liquid passes from duct 309 through passage 314, across recess 372, thence through duct 373, into the bore for piston 301, through line 375 to the bore of piston mechanism 318, thence through passage 376 to piston detent 326. When this occurs, drum PD is given a forward half index effecting the immediate stopping of head T. Obviously, positioning valve 307 in the position shown in Fig. 20 after having positioned it as shown in Fig. 21 will effect reverse half index to drum PD and re-start the apparatus from where it left off when it was instantly stopped by positioning valve 307 as shown in Fig. 21.

The valve 307 is provided with an exhaust passage 387 that extends from a point in line with duct 373 to the outside of valve 307 emptying into the housing for control C. The exhaust passage 387 is adapted to exhaust pressure liquid from piston 301 in the position shown in Fig. 17, and to exhaust pressure liquid from piston 296 in the positions shown in Figs. 19, 20 and 21. The valve 307 is also provided with exhaust passages 388 and 389 that extend from a point within valve 307 in the plane containing passage 382 (Fig. 18) to the outside of said valve, emptying into the housing for control C. Passage 389 exhausts pressure liquid from piston 303 when valve 307 is in the positions shown in Figs. 18 and 19. When valve 307 is in the position shown in Fig. 20, pressure liquid is, of course, supplied to piston 303. Passage 388 exhausts pressure liquid from piston 303 when valve 307 is in the position shown in Fig. 21. Referring to Figs. 17 and 11, valve 307 is provided with a gear 419 that meshes with a gear 420 on a shaft 421. Gear 420 meshes with a gear 422 fixed to a shaft 423. Referring to Fig. 11, shaft 423 extends throughout the length of the housing for control C and is provided with a crank 424 on the outside of said housing. Indices are located on the outside of said housing for indicating the four described positions to which valve 307 is adapted to be moved.

The present embodiment of the invention includes means for manually controlling the movement of head T independently of the automatic control comprising drums PD, DD and DD'. In fact, by removing the fingers 340 from nuts 337, the apparatus may be operated manually without affecting a predetermined setting on drums PD, DD and DD'.

Referring to Figs. 13 and 25, bracket 233 is provided with flanges 390 that support four shafts 391, 392, 393 and 394. The shaft 391 includes an actuator 395 (Fig. 25) that is adapted normally to lie between abutments on the pusher elements 234 for valves 188, 189, 190 and 191. The pusher 234 for valve 188 includes an inverted L-shaped lug 396 and pusher 234 for valve 189 includes a lug 397 in line with the horizontal arm of L-shaped lug 396. Accordingly, upon movement of actuator 395 to the left (Fig. 25) oscillatable movement in one direction actuates valve 188 and in the other direction actuates valve 189. Similarly, pusher 234 for valve 191 includes an inverted L-shaped lug 398, while element 234 for valve 190 includes a lug 399. Upon movement of actuator 395 to the right (Fig. 25), oscillatable movement in one direction actuates valve 190, and in the other direction actuates valve 191. In a like manner, shaft 392 includes an actuator 400 that is adapted to cooperate with lugs 401, 402, 403 and 404 on pushers 234 for valves 192, 193, 194 and 195, respectively.

Shaft 393 is provided with an actuator 405 that is adapted to cooperate with lugs 406, 407 on pushers 234 for valves 196, 197, respectively. Shaft 393 also includes an actuator 408 that is adapted to cooperate with lugs 409, 410 on pushers 234' for valves 200 and 201, respectively. Similarly, shaft 394 includes an actuator 411 that is adapted to cooperate with lugs 412 and 413 on elements 234 for valves 198 and 199, respectively. Additionally, shaft 394 includes an actuator 411' that is adapted to cooperate with lugs 412' and 413' on elements 234' for valves 202 and 203.

Referring to Fig. 22, shafts 391 and 392 are provided with handles 414, 415 and a chart 416 that indicates the axial and oscillatable positions in which these shafts must be placed to establish the sixteen feeds of the feedworks transmission F. Shafts 393 and 394 are provided with cranks 417, 418. Pushing shaft 393 inwardly and oscillating it by crank 417, will effect movement of head T along its vertical path at a feed rate depending upon the setting of shafts 391, 392. Pulling shaft 393 outwardly will effect vertical traverse movement of head T when its crank 417 is oscillated. Pushing shaft 394 inwardly and oscillating crank 418 will effect movement of head T along its horizontal path at a feed rate depending upon the setting of shafts 391 and 392. Finally, pulling shaft 394 outwardly and oscillating crank 418 will effect horizontal traverse of head T.

Referring to Figs. 11, 26 and 27, the dogs 283 on drum PD for effecting shifting of the feed gears are of slightly different design than those for shifting the feed and traverse clutches. In Fig. 26, the feed-gear dogs 283 are shown. They are of rectangular construction such that upon a forward half index of drum PD prior to repeating an operation, the feed gears remain in mesh. Additionally, when the same gear combination is desired for successive operations in a cycle, employing the feed-gear dogs as shown in Fig. 26 at successive points on drum PD detains in engagement the same gear combination during indexing of said drum. In Fig. 27, the feed and traverse clutch dogs 283 are shown in which they are beveled off so that upon any indexing of drum PD said clutches are instantly neutralized.

Referring to Fig. 9, the electrical circuit for the apparatus comprises a source of power 425 that is transformed to a lower voltage and impressed on a secondary circuit 426. The primary 425 comprises a circuit 427 including a solenoid 427' for valve 311 and a normally open solenoid-operated switch 428 that is controlled by the secondary 426. The secondary circuit 426 includes a solenoid 429 for switch 428, in series with a push-button switch 430 and a normally closed switch 431. Switch 431 is maintained open during a complete revolution of drum PD by a disc 432 connected to said drum. It is adapted to close upon completion of said revolution of drum PD. The micro-switch 360 is connected across the secondary on the power side of push-button switch 430. Closing main switch 433 will cause current to flow through the primary circuit 425 but not through solenoid 427'. Closing switch 430 will permit power to flow through the secondary circuit 426 including solenoid 429 and normally-closed switch 431, whereupon valve 311 is raised thereby effecting index of drums PD, DD and DD'. Immediately after such index, switch 431 is opened by disc 432 so that closing of switch 430 thereafter has no effect on the circuit. Upon opening of switch 431, solenoid 429 de-energizes and opens switch 428 causing de-energization of solenoid 427' and the downward movement of valve 311 by spring 311' whereupon the indexing mechanism I is reset for further action. Thereafter, each time switch 360 is closed by movement of drums DD and DD', drums PD, DD and DD' are indexed to new positions. When the drum PD has made a complete revolution, an elevated portion of disc 432 effects closing of switch 431 to place the circuit in condition to be re-started by pushing switch 430.

*Operation*

With the apparatus set as shown in Fig. 9, manually closing switch 430 will effect indexing of drums PD, DD and DD' whereupon valve 200 will be raised permitting fluid from line 185 to pass through line 216 to the left side of piston 155 thereby shifting clutch 127 to the right effecting the rotation of gear 123. Gear 123 rotates shaft 40 in a direction to move head T downwardly at traverse speed from its starting point to point $h$. When head T arrives at point $h$, the nut 337 on shaft 40 engages dog 335$h$ on drum DD which is then in line therewith. Engagement between nut 337 and dog 335$h$ effects a slight movement of drum DD closing switch 360 and energizing solenoid 429. Energization of solenoid 429 effects closing of switch 428 whereupon solenoid 427' is energized initiating the activity of the indexing mechanism I, whereupon drums PD, DD and DD' are indexed to position dogs on drum PD beneath valves 188, 193 and 197. Referring to the feed and traverse chart, Fig. 12, actuation of these three valves effects downward feeding of head T to point $i$ at a feed rate incident to the actuation of valves 188 and 193. At point $i$, the dog 337 on shaft 40 engages dog 335$i$ whereupon the drums PD, DD and DD' are indexed as above described to position a dog on drum PD beneath valve 201. Actuation of valve 201 effects upward traverse of head T to point $j$, whereupon the nut 337 on shaft 40 engages dog 335$j$ on drum DD causing drums PD, DD and DD' to be indexed again, whereupon dogs on drum PD actuate valves 189, 195 and 196 to cause head T to feed upwardly to point $k$. Arrival of head T at point $k$ causes nut 337 on shaft 40 to engage dog 335$k$ on drum DD, whereupon drums PD, DD and DD' are again indexed to locate dogs on drum PD beneath valves 190, 192 and 198. Actuation of these valves effects inward feeding of head T to point $l$ where the nut 337 on shaft 35 engages dog 335$l$ on drum DD', whereupon drums PD, DD and DD' are indexed to locate a dog on drum PD beneath valve 201 thereby effecting upward traverse of head T to point $m$. Arrival of head T at point $m$ causes engagement between the nut 337 on shaft 40 with dog 335m on drum DD thereby effecting indexing of drums PD, DD and DD' to locate a dog on drum PD beneath valve 202 whereupon head T traverses outwardly to the starting point. Arrival of head T at the starting point causes nut 337 on shaft 35 to engage dog 335n on drum DD' whereupon drums PD, DD and DD' are indexed to their starting positions where no valves are actuated by drum PD.

The above description includes drums PD, DD and DD' having only eight index positions in order to render the description of the operation as simple as possible. In actual practice, drums PD, DD and DD' are provided with a great number of index positions as described in connection with Fig. 11.

Although the various features of the machine tool and its control have been shown and described in detail to fully disclose one embodiment of this invention, it will be evident that numerous changes may be made in such details, and certain features may be used without others, without departing from the principles of the invention.

What is claimed is:

1. In a machine tool, a work support; a tool support; means for providing more than two successive relative movements between said tool support and work support at a plurality of speeds within a cycle of operation; means adapted selectively to be operated for controlling said relative movement-providing means; pre-settable means adapted selectively to operate a plurality of means including selected of said control means; a source of power for operating said pre-settable means; and separate means for controlling the extent of each successive relative movement between said supports and responsive thereto during a cycle of operation for rendering effective said source of power.

2. In a machine tool, a work support; a tool support; means for providing more than two successive relative movements between said supports at a plurality of speeds within a cycle of operation; means adapted selectively to be operated for controlling the operation of said relative movement-providing means; pre-settable means adapted selectively to operate a plurality of means including selected of said control means; a source of power for operating said pre-settable means; an electric circuit for controlling said source of power; and separate means for controlling the extent of each successive relative movement between said supports within said cycle of operation and responsive to said movement for operating said electric circuit to render effective said source of power.

3. In a machine tool, a work support; a tool support; means for providing more than two successive relative movements between said supports at a plurality of speeds within a cycle of operation; means adapted selectively to be operated for controlling the operation of said relative movement providing means; pre-settable means adapted selectively to operate a plurality of means including selected of said control means; means for indexing said pre-settable means from station to station; a source of power for indexing said pre-settable means; and separate means for controlling the extent of each successive relative movement between said supports and responsive thereto during a cycle of operation for rendering effective said source of power.

4. In a machine tool, a work support; a tool support; means for providing relative motion between said supports at a plurality of speeds; means adapted selectively to be operated for controlling the operation of said relative motion-providing means; pre-settable means adapted selectively to operate a plurality of means including selected of said control means; means for indexing said pre-settable means from station to station; a source of power for indexing said pre-settable means; means adapted to be indexed from one position to another for each of said relative motions between said supports, said means being responsive to the relative movement between said supports for determining when said source of power is to be rendered effective; and means for indexing said determining means simultaneously with the indexing of said pre-settable means.

5. In a machine tool, a work support; a tool support; means for providing relative movement between said supports along a plurality of paths at a plurality of speeds; means adapted selectively to be operated for controlling the operation of said relative motion-providing means; common means adapted adjustably to be pre-set for selectively operating said control means for providing said relative movement between said supports along said plurality of paths; a source of power for operating said pre-settable means; and means for each path of said relative movement between said supports, responsive to said relative movement for determining when said source of power is to be rendered effective.

6. In a machine tool, a work support; a tool support; means for providing relative movement between said supports along a plurality of paths at a plurality of speeds; means adapted selectively to be operated for controlling the operation of said relative motion-providing means; common means adapted adjustably to be pre-set for selectively operating said control means for providing said relative movement between said supports along said plurality of paths; a source of power for operating said pre-settable means; an electric circuit for controlling said source of power; and separate means for each path of said relative movement between said supports for operating said electric circuit to render effective said source of power.

7. In a machine tool, a work support; a tool support; means for providing relative movement between said supports along a plurality of paths at a plurality of speeds; common means adapted to be pre-set and adapted to be indexed from station to station for rendering effective said relative movement-providing means; a source of power for indexing said common means; and separate means for each path of said relative movement each including separate means responsive to successive relative movements between said supports for determining when said source of power is to be rendered effective.

8. In a machine tool, a work support; a tool support; means for providing relative movement between said supports along a plurality of paths at a plurality of speeds; common means adapted to be pre-set and adapted to be indexed from station to station for rendering effective said relative movement providing means; a source of power for indexing said common means; separate indexing means for each of the paths of said relative movement between said supports for determining when said source of power is to be rendered effective; and means for indexing said separate means simultaneously with the indexing of said common means.

9. In a machine tool, a work support; a tool support; means for moving said tool support in either direction along a path; a control member adapted to be pre-set and successively to be moved from position to position for controlling the movement of said tool support; a device movable in proportion to the movement of said tool support; and means for determining when said control member is to be moved including a plurality of elements successively engageable with said device and adapted instantly upon such engagement to be moved out of cooperative position relatively to said device.

10. In a machine tool, a work support; a tool support; means for moving said tool support in either direction along a path; a control drum adapted to be pre-set and successively to be indexed from station to station for controlling the movement of said tool support; means movable in proportion to the movement of said tool support; and means for determining when said control member is to be moved including a plurality of elements successively engageable with said movable means and adapted instantly upon such engagement to be moved out of cooperative position relatively to said movable means.

11. In a machine tool, a work support; a tool support; means for moving said tool support in either direction along a path; a control drum adapted to be pre-set and successively to be indexed from station to station for controlling the movement of said tool support; means movable in proportion to the movement of said tool support; means for determining when said control drum is to be indexed including a drum on which a plurality of elements is adapted adjustably to be mounted, said elements being successively engageable with said movable means and adapted instantly upon such engagement to be moved out of cooperative position relatively to said movable means; and means for simultaneously indexing said control drum and the drum on which said elements are mounted.

12. In a machine tool, a work support; a tool support; means for moving the tool support in either direction along a path; a control member adapted to be pre-set and successively to be moved from position to position for controlling the movement of said tool support; a source of power for moving said control member; means movable in proportion to the movement of said tool support; and means for determining when said source of power is to be rendered effective including a plurality of elements successively engageable with said movable means and adapted instantly upon such engagement to be moved out of cooperative position relatively to said movable means.

13. In a machine tool, a work support; a tool support; means for moving said tool support in either direction along a plurality of paths; a control member adapted to be pre-set and successively to be moved from position to position for controlling the movement of said tool support; individual means movable in proportion to the movement of said tool support along each of its paths of motion; and separate means for each of said paths for determining when said control member is to be moved, each of said separate means including elements successively engageable with its corresponding individual movable means and adapted instantly upon such engagement to be moved out of cooperative position relatively to said movable means.

14. In a machine tool, a work support; a tool support; means adapted to move said tool support in either direction along a plurality of paths; a control drum adapted to be pre-set and successively to be indexed from station to station for controlling the movement of said tool support; separate means adapted to be moved proportionally as said member moves along each of its paths of motion; separate drums for each of said paths on which elements are adapted adjustably to be mounted, for determining when said control drum is to be indexed, said elements being engageable with their corresponding separate movable means and adapted instantly upon such engagement to be moved out of cooperative position relatively to said movable means; and means for simultaneously indexing all of said drums.

15. In a machine tool, a work support; a tool support; means for moving said tool support in either direction along a plurality of paths; common control means adapted to be pre-set and successively to be moved from position for controlling the movement of said tool support along said plurality of paths; a source of power for moving said common control means; separate means for each path movable in proportion to the movement of said tool support along said paths; and means for determining when said source of power is to be rendered effective including elements for each path along which said tool support is adapted to be moved, the elements for each path being engageable with the movable means for that path and adapted instantly upon such engagement to be moved out of cooperative position relatively to said movable means.

16. A machine tool comprising in combination, a work-supporting member; a tool-supporting member; means providing relative rotation between said members; means providing successive relative rectilinear movement along separate paths between said members within a cycle of operation; a control for said rectilinear movement-providing means, including means adapted to be moved from station to station for selecting the path, speed and direction of said relative rectilinear movement; power means for moving said movable means from station to station; and separate means responsive to each of said relative rectilinear movements within said cycle of operation for initiating the activity of said power means.

17. A machine tool comprising in combination, a work-supporting member; a tool-supporting member; means providing relative rotation between said members; means providing relative rectilinear movement along separate paths between said members; a control for said rectilinear movement-providing means, including means adapted to be moved from station to station for selecting the path, speed and direction of said relative rectilinear movement; power means for moving said movable means from station to station; an electric circuit for controlling said power means; and means responsive to said relative rectilinear movement for operating said electric circuit to render effective said power means.

18. A machine tool comprising in combination, a work-supporting member; a tool-supporting member; means providing relative rotation between said members; means providing a plurality of relative rectilinear movements along separate paths between said members within a cycle of operation; a control for said rectilinear movement-providing means, including a drum adapted to be indexed from station to station and adapted adjustably to support means for selecting the path, speed and direction of said relative rectilinear movements within said cycle of operation; power means for indexing said drum; and separate means responsive to each of said relative rectilinear movements within said cycle of operation for initiating the activity of said power means.

19. A machine tool comprising in combination, a work-supporting member; a tool-supporting member; means providing relative rotation between said members; means providing relative rectilinear movement along separate paths between said members; a control for said rectilinear movement-providing means, including a drum adapted to be indexed form station to station for selecting the path, speed and direction of said relative rectilinear movement; fluid-actuated means for indexing said drum; and means responsive to said relative rectilinear movement for initiating the activity of said fluid actuated means.

20. In a machine tool, a member adapted to be moved along at least one path at a plurality of speeds; means for moving said member; a control associated with said member-moving means including a pre-settable member; automatic means adapted to move said pre-settable member from position to position for setting up various conditions within said member-moving means; separate means for controlling the extent of successive movements of said member along said path and responsive to said movements for rendering effective said automatic means; and means for manually controlling the operation of said member-moving means without affecting the setting of said control member.

21. In a machine tool, a member adapted to be moved along at least one path; means for moving said member; a control associated with said member-moving means including a pre-settable member; automatic means adapted to move said pre-settable member from position to position; means adapted to be actuated by said pre-settable member for setting up various conditions within said member-moving means; separate means for controlling the extent of successive movements of said member along said path and responsive to said movements for rendering effective said automatic means; and manually operable means adapted to actuate said actuatable means for manually controlling the operation of said member-moving means without affecting the setting of said control member.

22. In a machine tool, a member adapted to be moved along at least one path; means for moving said member; a control associated with said member-moving means including a pre-settable member adapted automatically to be moved from position to position for setting up various conditions within said member-moving means; means for manually controlling the operation of said member-moving means without affecting the setting of said control member; a source of power for operating said pre-settable member; and separate means for controlling the extent of successive movements of said member along said path, and responsive to the movement of said member for rendering effective said source of power.

23. In a machine tool, a member adapted to be moved along at least one path; a transmission for moving said member; a control associated with said transmission including a pre-settable member adapted automatically to be moved from position to position for setting up various gear combinations within said transmission; means for manually controlling the operation of said transmission without affecting the setting of said control member; a source of power for operating said pre-settable means; an electric circuit for controlling said source of power; and separate means for controlling the extent of successive movements of said member along said path, and responsive to the movement of said member for operating said electric circuit to render effective said source of power.

24. In a machine tool, a work-supporting member; a tool-supporting member; means adapted to provide relative rotation between said members; means adapted to provide relative rectilinear movement along separate paths between said members; a control for said rectilinear movement-providing means adapted upon operation to select the path, speed and direction of said relative rectilinear movement; and manually-operable means for selecting the path, speed and direction of said relative rectilinear movement between said members independently of said control.

25. In a machine tool, a work-supporting member; a tool-supporting member; means adapted to provide relative rotation between said members; means adapted to provide relative rectilinear movement along separate paths between said members; a control for said rectilinear movement-providing means including fluid-actuated means and a control member adapted to be moved from station to station; a plurality of valves for controlling said fluid-actuated means; means acted upon by said control member for actuating said valves for selecting the path, speed and direction of said relative rectilinear movement; and manually-operable means adapted to cooperate with said valve-actuating means for selecting the path, speed and direction of said relative rectilinear movement between said members independently of said control member.

26. In a machine tool, a work-supporting member; a tool-supporting member; means adapted to provide relative rotation between said members; means adapted to provide relative rectilinear movement along separate paths between said members; a control for said rectilinear movement-providing means adapted upon operation to select the path, speed and direction of said relative rectilinear movement; a source of power for operating said control; means responsive to said rectilinear movement for determining when said source of power is to be rendered effective; and manually-operable means for selecting the path, speed and direction of said relative rectilinear movement between said members independently of said control.

27. In a machine tool, a work-supporting member; a tool-supporting member; means adapted to provide relative rotation between said members; means adapted to provide relative rectilinear movement along separate paths between said members; a control for said rectilinear movement-providing means adapted upon operation to select the path, speed and direction of said relative rectilinear movement; a source of power for operating said control; means responsive to the movement of said member for operating an electric circuit to render effective said source of power; and manually operable means for selecting the path, speed and direction of said relative rectilinear movement between said members independently of said control.

28. A machine tool comprising in combination, a work-supporting member; means for rotating said work-supporting member; a cross-rail; a tool-supporting member mounted on said cross-rail and adapted to be moved along intersecting paths; a transmission adapted to be driven by said member-rotating means and adapted to drive said tool-supporting member along said intersecting paths; a control for said transmission; said transmission and control being mounted on said cross-rail; said control including means adapted to be moved from station to station and adapted adjustably to support means for selecting the path, speed and direction of movement of said tool-supporting member; power means for moving the movable means of said control; and means responsive to the movement of said tool-supporting member for initiating the activity of said power means.

29. A machine tool comprising in combination, a work-supporting member; means for rotating said work-supporting member; a cross-rail; a tool-supporting member mounted on said cross-rail and adapted successively to be moved along intersecting paths within a cycle of operation; a transmission adapted to be driven by said member-rotating means and adapted to drive said tool-supporting member along said intersecting paths; a control for said transmission; said transmission and control being mounted on said cross-rail; said control including a drum adapted successively to be indexed from station to station for selecting the path, speed and direction of movement of said tool-supporting member for each succeeding movement thereof within said cycle of operation; power means for indexing said drum; and separate means responsive to each of the movements of said tool-supporting member within said cycle of operation for initiating the activity of said power means.

30. A machine tool comprising in combination, a work-supporting member; means for rotating said work-supporting member; a cross-rail; a tool-supporting member mounted on said cross-rail and adapted to be moved along intersecting paths; a transmission adapted to be driven by said member-rotating means and adapted to drive said tool-supporting member along said intersecting paths; a control for said transmission; said transmission and control being mounted on said cross-rail; said control including a drum adapted to be indexed from station to station; fluid-actuated means for indexing said drum for selecting the path, speed and direction of movement of said tool-supporting member; and means responsive to the movement of said tool-supporting member for initiating the activity of said fluid-actuated means.

31. A machine tool comprising in combination, a work-supporting member; means for rotating said work-supporting member; a cross-rail; a tool-supporting member mounted on said cross-rail and adapted to be moved along intersecting paths; a transmission adapted to be driven by said member-rotating means and adapted to drive said tool-supporting member along said intersecting paths; a control for said transmission; said transmission and control being mounted on said cross-rail; said control including a drum adapted to be indexed from station to station; fluid-actuated means for indexing said drum for selecting the path, speed and direction of movement of said tool-supporting member; and means responsive to the movement of said tool-supporting member for operating an electric circuit to render effective said fluid-actuated means.

32. In a machine tool, a tool-support adapted to be moved along separate paths at a plurality of speeds; a transmission for moving said tool-support along said paths; fluid-actuated means within said transmission for connecting it to and for disconnecting it from said support; valves between said fluid-actuated means and a source of fluid under pressure; a controller for said transmission including a function drum adapted to be indexed from station to station for selectively actuating said valves in accordance with a predetermined order; fluid-actuated means for indexing said function drum; a distance-determining drum for each path along which said support is adapted to be moved; and means movable in proportion to the movement of said support along each of its paths and adapted to cooperate with said distance-determining drums for initiating the activity of said fluid-actuated means for indexing said function drum.

33. A machine tool comprising in combination, a frame; a member mounted on said frame and adapted to be moved along intersecting paths at a plurality of speeds; means for moving said member along said paths at said speeds; manually-operable means for controlling said member-moving means; an automatic control for said member moving means including mechanism adapted to be pre-set for actuating means associated with said member-moving means for selecting the path, distance and speed of movement of said member for causing said member to perform a series of functions in sequence; and a single control lever adapted to be moved for rendering said automatic control ineffective whereby said manual control means may be employed.

34. A machine tool comprising in combination, a frame; a member mounted on said frame and adapted to be moved along intersecting paths at a plurality of speeds; means for moving said member along said paths at said speeds; manually-operable means for controlling said member-moving means; an automatic control for said member moving means including drums adapted to be pre-set and to be indexed from station to station for actuating means associated with said member-moving means for selecting the path, distance and speed of movement of said member for causing said member to perform a series of functions in sequence; and a single control lever adapted to be moved to a position whereby said drums are indexed to an ineffective position, whereby said manual control of said machine tool may be employed.

35. A machine tool comprising in combination, a frame; a member mounted on said frame and adapted to be moved along intersecting paths at a plurality of speeds; means for moving said member along said paths at said speeds; manually-operable means for controlling said member-moving means; an automatic control for said member moving means including drums adapted successively to be indexed through a predetermined number of degrees for actuating means associated with said member-moving means for selecting the path, distance and speed of movement of said member for causing said member to perform a series of independent functions in sequence; and a single control lever adapted to be moved to a position where said drums will be indexed through said number of degrees, said lever also being adapted to be moved to another position where said drums will be indexed a lesser number of degrees to position said drums in an ineffective position, whereby said machine tool may be manually controlled.

36. In a machine tool, a control comprising a drum adapted to be indexed from station to station; dogs on said drum for selectively actuating means for controlling the operation of said machine tool; means for indexing said drum through a predetermined number of degrees in one direction to change the operation of the machine tool; means for indexing said drum through a lesser number of degrees in the same direction for stopping the operation of said machine tool; and means for indexing said drum through said lesser number of degrees in the reverse direction to effect a repetition of the last preceding operation performed by said machine tool.

37. In a machine tool, a control comprising a drum adapted to be indexed from station to station; dogs on said drum for selectively actuating means for controlling the operation of said machine tool; means for indexing said drum through a predetermined number of degrees in one direction to change the operation of the machine tool; means for indexing said drum through a lesser number of degrees in the same direction for stopping the operation of said machine tool; means for indexing said drum through said lesser number of degrees in the reverse direction to effect a repetition of the last preceding operation performed by said machine tool; and a single lever adapted to be moved to a plurality of positions for controlling all of said indexing means.

38. In a machine tool, a control comprising a drum adapted to be indexed from station to station; dogs on said drum for selectively actuating means for controlling the operation of said machine tool; means for indexing said drum through a predetermined number of degrees in one direction; means for indexing said drum through a lesser number of degrees in the same direction, means for indexing said drum through said lesser number of degrees in the reverse direction; a source of fluid under pressure; and a valve adapted to be moved to a plurality of positions for controlling the flow of fluid to all of said indexing means.

39. In a machine tool, a member adapted to be moved in both directions along at least one path at a plurality of speeds; means for moving said member; a control adapted to select the path, direction and speed of movement of said member including a drum adapted to be indexed from station to station; a source of power for successively indexing said drum through a predetermined number of degrees in a forward direction to effect the performance of a cycle of operation of the machine tool; and means adapted to be actuated for indexing said drum through a lesser number of degrees in the same direction for stopping the operation of said machine tool, said means being effective only in response to the completion of the operation being performed when said means is actuated.

40. In a machine tool, a member adapted to be moved in both directions along at least one path at a plurality of speeds; means for moving said member; a control adapted to select the path, direction and speed of movement of said member including a drum adapted to be indexed from station to station; a source of power for successively indexing said drum through a predetermined number of degrees in a forward direction to effect the performance of a cycle of operation of the machine tool; means adapted to be actuated for indexing said drum through a lesser number of degrees in the same direction for stopping the operation of said machine tool, said means being effective only in response to the completion of the operation being performed when said means is actuated; and means for indexing said drum in a reverse direction through said lesser number of degrees for repeating the last preceding operation of said machine tool.

41. In a machine tool, a member adapted to be moved in both directions along at least one path at a plurality of speeds; means for moving said member; a control adapted to select the path, direction and speed of movement of said member including a drum adapted to be indexed from station to station; a source of power for successively indexing said drum through a predetermined number of degrees in a forward direction to effect the performance of a cycle of operation of the machine tool; means adapted to be actuated for indexing said drum through a lesser number of degrees in the same direction for stopping the operation of said machine tool, said means being effective only in response to the completion of the operation being performed when said means is actuated; means for indexing said drum in a reverse direction through said lesser number of degrees for repeating the last preceding operation of said machine tool; and means for indexing said drum through said lesser number of degrees in said forward direction for instantly stopping the operation of said machine tool.

42. In a machine tool, a member adapted to be moved along at least one path; means for moving said member; a control associated with said member-moving means including a pre-settable member adapted automatically to be moved from position to position for controlling successive movements of said member along said path; means associated with the path of movement of said member and responsive to the movement of said member for determining the amount of movement of said member each time it moves along said path; and means for manually controlling the movement of said member without affecting the setting of said pre-settable member.

43. In a machine tool, a member adapted to be moved along a plurality of paths; means for moving said member along each of said paths; a control associated with said member-moving means including a pre-settable member adapted automatically to be moved from position to position for controlling successive movements of said member along each of said paths; means associated with each path along which said member is adapted to be moved and responsive to the movement of said member along said path for determining the amount of movement of said member each time it moves along said path; and means for manually controlling the movement of said member without affecting the setting of said pre-settable member.

44. In a machine tool, a work support; means for moving said work support; a tool support; means for moving said tool support; means movable in proportion to the movement of said tool support; a control member including a plurality of portions each adapted selectively to be set for causing said tool support to produce any function of which it is capable; means for controlling said control member, including a plurality of other portions, one for each of said control-member portions each of said other portions being adapted to support adjustable means, said proportionally-movable means being adapted to actuate said adjustable means for initiating the activity of said control member; and means for maintaining all of said portions in exact phase relation at all times.

45. In a machine tool, a work support; means for moving said work support; a tool support; means for moving said tool support in either direction along a path at any one of a plurality of speeds; means movable in proportion to the movement of said tool support; a control member including specific portions adapted adjustably to support means for selectively controlling said tool-support moving-means; means for controlling the effectiveness of said control member including a portion for each specific portoin of said control member adapted adjustably to support means for controlling said control member, said proportionally-movable means being adapted to actuate said adjustable means; and means for maintaining all of said portions in exact phase relation at all times.

46. In a machine tool, a work support; means for moving said work support; a tool support; means for moving said tool support in either direction along a plurality of paths at a plurality of speeds; a control member common to the plurality of paths of movement of said tool support including a plurality of portions, each adapted selectively to be set for controlling said tool-support moving-means; separate means for each path along which said tool support is adapted to be moved for controlling the starting, stopping and duration of motion of said tool support along said path, each of said separate means including a plurality of portions, one for each of said control-member portions; and means for maintaining all of said portions in exact phase relation at all times.

EDWARD P. BULLARD, III.
LE ROY E. ALVEY.
FRANK H. MUSSLER.

CERTIFICATE OF CORRECTION.

Patent No. 2,352,185.  June 27, 1944.

EDWARD P. BULLARD, III, ET AL.

It is hereby certified that error appears in the printed specification of the above numbered patent requiring correction as follows: Page 11, first column, line 61, for "detains" read --retains--; page 13, second column, line 22, claim 15, after "position" insert --to position--; page 14, first column, line 17, claim 19, for "form" read --from--; page 17, first column, line 17, claim 45, for "portoin" read --portion--; and that the said Letters Patent should be read with this correction therein that the same may conform to the record of the case in the Patent Office.

Signed and sealed this 5th day of September, A. D. 1944.

Leslie Frazer (Seal)  Acting Commissioner of Patents.